United States Patent [19]
Haraguchi et al.

[11] Patent Number: 5,170,294
[45] Date of Patent: Dec. 8, 1992

[54] METHOD OF CONTROLLING THE ZOOM LENS ASSEMBLY

[75] Inventors: Keisuke Haraguchi; Yukio Takaoka; Shinsuke Kohmoto; Takeo Kobayashi; Takayuki Ito; Tomoaki Kobayashi, all of Tokyo, Japan

[73] Assignee: Asahi Kogaku Kogyo Kabushiki Kaisha, Tokyo, Japan

[21] Appl. No.: 421,613

[22] Filed: Oct. 13, 1989

[30] Foreign Application Priority Data

Oct. 15, 1988 [JP] Japan ................................ 63-260022
Dec. 27, 1988 [JP] Japan ................................ 63-330468
Apr. 7, 1989 [JP] Japan .................................... 1-88346

[51] Int. Cl.$^5$ ............................................ G02B 27/00
[52] U.S. Cl. .................................... 359/900; 359/697
[58] Field of Search ............... 359/900, 697, 693, 784, 359/791, 823, 694, 695, 696, 698; 354/400, 403, 195.12, 195.13, 199

[56] References Cited

U.S. PATENT DOCUMENTS

| | | | |
|---|---|---|---|
| 4,161,756 | 7/1979 | Thomas | 359/697 |
| 4,621,906 | 11/1986 | Hashimoto et al. | 359/695 |
| 4,627,691 | 12/1986 | Tomori | 359/700 |
| 4,696,559 | 9/1987 | Kondo | 354/403 |
| 4,786,153 | 11/1988 | Ogata | 359/693 |
| 4,822,153 | 4/1989 | Tomori et al. | 359/700 |
| 4,842,385 | 6/1989 | Tanaka | 359/683 |

FOREIGN PATENT DOCUMENTS

| | | |
|---|---|---|
| 3026215 | 1/1981 | Fed. Rep. of Germany . |
| 2-373804 | 7/1978 | France . |
| 60-6914 | 1/1985 | Japan . |
| 60-006914 | 1/1985 | Japan . |
| 62-237416 | 10/1987 | Japan . |
| 62-244026 | 10/1987 | Japan . |
| 63-239430 | 10/1988 | Japan . |
| 2054878 | 2/1981 | United Kingdom . |
| 2-112957 | 7/1983 | United Kingdom . |
| WO8707038 | 11/1987 | World Int. Prop. O. . |

OTHER PUBLICATIONS

English Abstract of Japanese Patent No. 60-006914.
English Abstract of Japanese Patent No. 62-237416.
English Abstract of Japanese Patent No. 62-244026.
English Abstract of Japanese Patent No. 63-239430.
French Search Report and and Annex.
D. Hacman, "Jahrbuch fur Optik und Fienmechanik", Pegasus Verlag Wetzlar, (1972), pp. 36-37.

Primary Examiner—Loha Ben
Attorney, Agent, or Firm—Sandler, Greenblum & Bernstein

[57] ABSTRACT

A method of controlling the focusing of a zoom lens which has a plurality of lens groups including at least one focusing lens group, wherein an amount of deviation from focus caused by a zoom operation is corrected by movement of the focusing lens group. The method includes setting a reference object distance, at which no deviation from focus occurs during zooming of the zoom lens, at a finite object distance, such that the amount of movement of the focusing lens group necessary to effect focusing is determined based upon a reference position corresponding to a position of the focusing lens group at the reference object distance, in accordance with focal length data and object distance data. The zoom lens assembly includes a stationary lens barrel and a rotatable cam ring which is supported on the stationary lens barrel for movement in the direction of the optical axis while being rotated, and which includes at least two cam grooves. The zoom lens includes first and third lens groups which are both movable by one of the two cam groups in a direction of an optical axis. A second lens group movable by a second of the two cam grooves in a direction of the optical axis is also provided, as well as a focusing mechanism for moving the second lens group to a position which is determined by focal length data derived from actual positions of the first, second, and third lens groups and object distance data detected by the object distance measuring device.

10 Claims, 29 Drawing Sheets

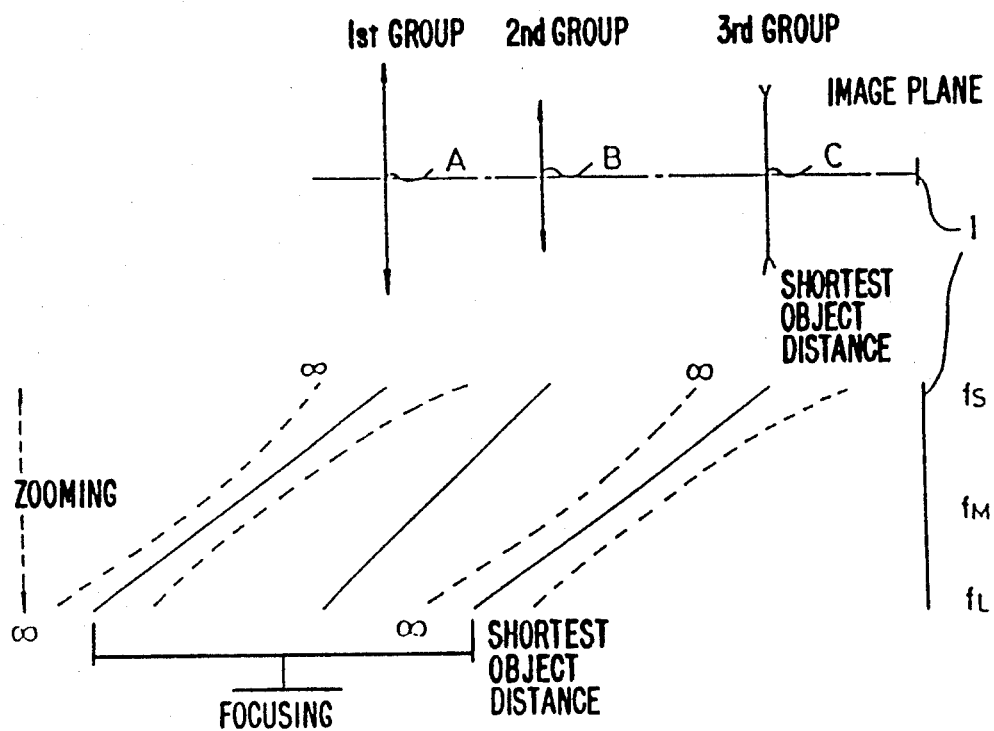
FIG. IE

| POS | 0 | 1 | 2 | 3 4 | 5 6 | 7 8 | 9 A | B C | D | E |
|---|---|---|---|---|---|---|---|---|---|---|
| ZC2 | 0 | 0 | 1 | 1 1 | 1 1 | 1 1 | 1 1 | 1 1 | 0 | 0 |
| ZC1 | 1 | 0 | 0 | 0 1 | 1 0 | 0 1 | 1 0 | 0 1 | 1 | 0 |
| ZC0 | 1 | 1 | 1 | 0 0 | 1 1 | 0 0 | 1 1 | 0 0 | 0 | 0 |
| ZC | 3 | 1 | 5 | 4,6 | 7,5 | 4,6 | 7,5 | 4,6 | 2 | 0 |
| | 38 | 38 | 38 | 50 | 65 | 80 | 95 | 105 | 105 | 105 |
| | LOCK POSITION | STOP PROHIBITED POSITION | | ZOOMING RANGE | | | | STOP PROHIBITED POSITION | MACRO POSITION | |
| | ABSOLUTE CODE | | | RELATIVE CODE | | | | ABSOLUTE CODE | | |

FIG. 17

| FOCAL LENGTH | (WIDE) 38mm | 44mm | 50mm | 57mm | 65mm | 72mm | 80mm | 87mm | 95mm | 100mm | (TELE) 105mm | (MACRO) 105mm |
|---|---|---|---|---|---|---|---|---|---|---|---|---|
| LL\POS | 2 | 3 | 4 | 5 | 6 | 7 | 8 | 9 | A | B | C | E |
| 0 | 100 | 100 | 100 | 100 | 100 | 100 | 100 | 100 | 100 | 100 | 100 | 1.38 |
| 1 | 100 | 100 | 100 | 100 | 100 | 100 | 100 | 100 | 14.0 | 14.0 | 14.0 | 1.33 |
| 2 | 100 | 100 | 100 | 100 | 100 | 14.0 | 14.0 | 14.0 | 13.3 | 12.3 | 12.0 | 1.28 |
| 3 | 100 | 100 | 100 | 14.0 | 14.0 | 13.3 | 11.4 | 10.1 | 9.31 | 8.86 | 8.71 | 1.23 |
| 4 | 100 | 14.0 | 14.0 | 12.3 | 10.2 | 9.03 | 8.20 | 7.61 | 7.16 | 6.92 | 6.84 | 1.19 |
| 5 | 14.0 | 12.1 | 9.85 | 8.34 | 7.44 | 6.83 | 6.41 | 6.08 | 5.83 | 5.68 | 5.63 | 1.15 |
| 6 | 9.03 | 7.91 | 7.00 | 6.29 | 5.83 | 5.50 | 5.26 | 5.07 | 4.91 | 4.82 | 4.79 | 1.12 |
| 7 | 6.36 | 5.87 | 5.43 | 5.06 | 4.80 | 4.61 | 4.46 | 4.34 | 4.25 | 4.19 | 4.17 | 1.08 |
| 8 | 4.92 | 4.67 | 4.44 | 4.23 | 4.08 | 3.97 | 3.88 | 3.80 | 3.74 | 3.71 | 3.69 | 1.05 |
| 9 | 4.01 | 3.88 | 3.75 | 3.64 | 3.55 | 3.48 | 3.43 | 3.38 | 3.35 | 3.32 | 3.31 | 1.02 |
| 10 | 3.39 | 3.32 | 3.25 | 3.19 | 3.14 | 3.10 | 3.07 | 3.05 | 3.03 | 3.01 | 3.01 | 0.99 |
| 11 | 2.93 | 2.90 | 2.87 | 2.84 | 2.82 | 2.80 | 2.79 | 2.77 | 2.76 | 2.76 | 2.75 | 0.96 |
| 12 | 2.59 | 2.58 | 2.57 | 2.56 | 2.56 | 2.55 | 2.55 | 2.55 | 2.54 | 2.54 | 2.54 | 0.94 |
| 13 | 2.32 | 2.32 | 2.33 | 2.34 | 2.34 | 2.35 | 2.35 | 2.35 | 2.36 | 2.36 | 2.36 | 0.91 |
| 14 | 2.10 | 2.11 | 2.13 | 2.15 | 2.16 | 2.17 | 2.18 | 2.19 | 2.19 | 2.20 | 2.20 | 0.89 |
| 15 | 1.92 | 1.94 | 1.96 | 1.99 | 2.00 | 2.02 | 2.03 | 2.05 | 2.05 | 2.06 | 2.06 | 0.87 |
| 16 | 1.77 | 1.79 | 1.82 | 1.85 | 1.87 | 1.89 | 1.91 | 1.92 | 1.93 | 1.94 | 1.94 | 0.85 |
| 17 | 1.64 | 1.67 | 1.70 | 1.73 | 1.75 | 1.78 | 1.79 | 1.81 | 1.82 | 1.83 | 1.84 | 0.83 |
| 18 | 1.53 | 1.56 | 1.59 | 1.62 | 1.65 | 1.67 | 1.69 | 1.71 | 1.73 | 1.74 | 1.74 | 0.81 |
| 19 | 1.43 | 1.46 | 1.50 | 1.53 | 1.56 | 1.58 | 1.61 | 1.62 | 1.64 | 1.65 | 1.65 | 0.79 |
| 20 | 1.34 | 1.38 | 1.41 | 1.45 | 1.48 | 1.50 | 1.53 | 1.55 | 1.56 | 1.57 | 1.58 | 0.78 |
| 21 | 1.27 | 1.30 | 1.34 | 1.37 | 1.41 | 1.43 | 1.45 | 1.47 | 1.49 | 1.50 | 1.51 | 0.75 |
| 22 | 1.20 | 1.24 | 1.27 | 1.31 | 1.34 | 1.37 | 1.39 | 1.41 | 1.43 | 1.44 | 1.44 | 0.74 |
| 23 | 1.14 | 1.18 | 1.21 | 1.25 | 1.28 | 1.31 | 1.33 | 1.35 | 1.37 | 1.38 | 1.38 | 0.73 |
| 24 | 1.09 | 1.12 | 1.16 | 1.19 | 1.22 | 1.25 | 1.28 | 1.30 | 1.31 | 1.33 | 1.33 | 0.72 |
| 25 | 0.00 | 0.00 | 0.00 | 0.00 | 0.00 | 0.00 | 0.00 | 0.00 | 0.00 | 0.00 | 0.00 | 0.00 |

UNIT: m

FIG. 18

METHOD OF CONTROLLING THE ZOOM LENS ASSEMBLY

BACKGROUND OF THE INVENTION

1. Field of the Invention

The present invention relates to a zoom lens which can be advantageously used for an autofocus camera, particularly for a compact camera. More precisely, the present invention relates to a control method of a vari-focal lens including magnification control and focus control and a zoom lens barrel assembly to which the control method is applied.

2. Description of Background Information

A conventional zoom lens for a camera has a focal point which does not move during zooming. For instance, such a known zoom lens has a first lens group having a positive focal length and a second lens group having a negative focal length, wherein zooming is effected by varying the distance between the first and second lens groups, and focusing is effected only by the first lens group. However, in this type of zoom lens, it is necessary to increase the displacement of the lens groups in order to increase magnification. In practice, it is virtually impossible to obtain a large magnification because of the restricted displacement of the lens groups. A large magnification can be easily realized by a vari-focal lens. However, in a vari-focal lens, the focal point thereof moves during zooming, and accordingly, such a vari-focal lens is usually not used in a single-lens reflex camera.

In an autofocus camera having a photographic optical system and a separate finder optical system, the movement of the focal point which is caused by the zooming operation can be compensated for by the movement of the focusing lens group. Namely, since the position of the focusing lens group at which an "in focus" image can be formed on a film plane is predetermined in accordance with the focal length and the object distance, the focusing lens group can be moved to the predetermined position in accordance with the focal length and the object distance to form an "in focus" image. This is because a vari-focal lens can be used as a zoom lens either in an autofocus type of single-lens reflex camera or an autofocus type of compact camera. However, the focusing speed of a single-lens reflex camera is relatively slow in comparison with a compact camera. Generally, a lens which varies magnification without the movement of a focal point is called a zoom lens, and a lens in which the focal point moves in accordance with a change of magnification is called a vari-focal lens. In this disclosure, "zoom lens" includes both zoom lenses and vari-focal lenses.

There is a known zoom lens for a camera, having a first lens group with a positive focal length, a second lens group with a positive focal length, and a third lens group with a negative focal length, wherein focusing is effected by the second lens group or the third lens group. See, e.g., "Shashin Kogyo", June 1988 technical report, pages 81–86, and Japanese Patent Application No. 63-225294, filed in the name of the assignee of the present application.

Also known is a zoom lens which has a basic construction similar to the above-mentioned known zoom lens and in which the second lens group consists of two sub-groups having a negative focal length and a positive focal length, respectively, as disclosed, for example, in Japanese Patent Application No. 63-225294 mentioned above. The sub-groups of lenses are moved along different tracks during zooming and are moved together or separately during focusing. This prior Japanese patent application also discloses an alternative in which the focusing is effected by the movement of the third lens group.

These known zoom lenses are small in size and have a relatively large magnification. However, generally speaking, in a zoom lens in which the displacement of the focal point takes place in accordance with a change in magnification, the position of the zoom lens is adjusted so that no displacement of the focal point occurs when zooming is effected at an infinite object distance. The same is true in the above-mentioned prior Japanese patent application. If the number of divisions (number of steps) of the focal lengths within a zooming range is small, a deviation in focus (an amount of deviation due to divided focal lengths) at the points of division increases as the object distance decreases, due to such an adjustment of the position of the zoom lens. In a compact camera, upon focusing, the focus lens group is moved to come to a specific point of a plurality of predetermined divided points of object distance, which specific point is closest to an object distance detected by an object distance detecting device. This inevitably causes a deviation in focus (an amount of deviation due to divided object distances) at the specific point. The latter deviation of focus (an amount of deviation due to divided object distances) in addition to the former deviation of focus (an amount of deviation due to divided focal lengths) increases the degree by which the object is "out of focus" as the object distance decreases. This problem will be discussed hereinafter in more detail in connection with the present invention.

SUMMARY OF THE INVENTION

A primary object of the present invention is to provide a controlling method of a zoom lens in which the amount of deviation from focus can be decreased even if the number of divisions of focal lengths is small.

Another object of the present invention is to provide a zoom lens barrel having a zoom lens with three lens groups, in which a first lens group and a third lens group are moved together to effect zooming and only a second lens group is moved to effect focusing.

The inventors of the present invention have found that the above-mentioned problems which characterize the prior art can be solved when a reference object distance at which no displacement of focal point occurs during zooming is set to be a specific finite object distance rather than an infinite object distance, as in the prior art.

One of the features of the present invention resides in a zoom lens for an autofocus camera in which the displacement of focus caused by the zooming operation is corrected by the focusing lens group, wherein a reference object distance at which no displacement of the focal point occurs during zooming is set at a finite object distance, so that the displacement of the focusing lens group necessary for the focusing operation can be determined based upon a reference position corresponding to a position of the focusing lens group at the reference object distance, in accordance with focal point data and object distance data.

Although the present invention can be advantageously applied to a compact camera, the invention is not limited thereto and can be applied to an autofocus type of the single lens reflex camera.

The control method of a zoom lens according to the present invention can be applied generally to vari-focal zoom lenses including the types referred to in the description of the prior art mentioned above.

The following are typical examples of vari-focal zoom lenses to which the present invention can be applied:

1. A type having two lens groups in which a second lens group or a part thereof is used as a focusing lens group; and 2. A type having more than two lens groups, including:

a. a type in which focusing is effected by a lens group other than a first lens group;

b. a type in which focusing is effected by a part of a lens group other than a first lens group;

c. a type in which focusing lens group is made of a plurality of lens groups which are moved together or separately to effect focusing;

d. a type in which focusing lens group is made of a plurality of lens groups which are moved together to effect zooming and moved separately to effect focusing; and e. a type in which focusing lens group is made of a plurality of lens groups which are moved separately to effect both zooming and focusing.

In any type of above-mentioned vari-focal zoom lens, when the reference object distance is set at a specific finite object distance, increased precision in focusing at an object distance can be expected. The reference object distance is determined by an object distance at which a more precise focusing is desired, as can be understood from the above discussion. For instance, to average the precision of focusing at the infinite object distance and closest object distance, the reference object distance is approximately 1.5 to 2.5 times the closest object distance, and preferably twice the closest object distance. In case of an autofocus camera having an active object distance measuring system which emits a measuring light, and if it is desired that the most accurate focus is obtained on the infinite object distance side, the reference object distance is about twice the longest distance which the measuring light reaches.

The zoom lens assembly of the present invention includes an object distance measuring device, including a stationary lens barrel; a rotatable cam ring which is supported on the stationary lens barrel to move in the optical axis direction while rotating and which has at least two cam grooves formed thereon; a first lens group and a third lens group which are moved by one of the two cam grooves; three lens groups, among which the first lens group and the third lens group are functionally connected to one of the two cam grooves to be moved in the direction of the optical axis, and the second lens group being functionally connected to the other cam groove to be moved in the direction of the optical axis; and a focusing mechanism which moves the second lens group to a position which is determined by photographic data, particularly focal length data depending upon actual positions of the first, second and third lens groups, and object distance data detected by the object distance measuring device.

The zoom lens assembly further includes a linearly movable ring which is movable together with the cam ring in the optical axis direction and which is rotatable relative to the cam ring when the cam ring moves in the optical axis direction, the linearly movable ring being provided with linear movement guide grooves by which the first lens group, the second lens group, and the third lens group are guided to move in the optical axis direction.

The cam ring of the lens assembly has a zooming section in which the cam ring is rotatable for moving the first, second, and third lens groups in the optical axis direction to effect zooming, and an accommodating section in which the cam ring is rotatable for moving the first, second, and third lens groups beyond an extremity of the zooming section to retract the first, second, and third lens groups.

Further, the first lens group is positioned within the zoom lens assembly to be moved by rotation of the cam ring to approach the third lens group in the accommodating section.

Lens frames are provided for supporting the first lens group and the third lens group, the lens frames having engaging portions which restrict the largest distance between the first lens group and the third lens group.

In another aspect of the invention, the three lens groups include a first lens group and a third lens group connected for movement together, and a second lens group for movement relative to the first lens group and third lens group to effect zooming. The second lens group is solely moved to effect focusing, and the third lens group is adapted to move beyond a boundary of a photographic range in which a photograph can be taken, for retraction in the zoom lens barrel, independently of the first lens group.

In a further aspect of the invention, a rotatable cam ring is provided which rotates to move the first, second, and third lens groups in an optical axis direction. Also, a lens moving ring is provided for movement by rotation of the cam ring in the optical axis direction, a lens frame for supporting the second lens group, and a shutter block which is associated with the lens frame.

The invention also includes a barrier mechanism for which includes barrier plates for opening and closing an opening of the lens barrel, the barrier plates being slidable relative to each other to open and close the opening between an inoperative position, in which the barrier plates are located beyond the opening, and an operative position, in which the barrier plates are located side-by-side to close the opening. Preferably, the barrier mechanism includes a pair of barrier plate assemblies which are adapted to be associated with the lens barrel to open and close an opening of the lens barrel, wherein each of the pair of barrier plate assemblies includes a pair of plate elements which are symmetrically arranged with respect to the center of the opening.

BRIEF DESCRIPTION OF THE DRAWINGS

The aforementioned objects, features, and advantages of the present invention are described below in more detail with regard to preferred non-limiting embodiments with reference to the accompanying drawings in which:

FIGS. 1E, 1F, and 1G are schematic views showing different tracks along which various lens groups move in a different zoom lens, according to another embodiment of the present invention;

FIG. 17 is a diagram showing the relationship between zoom codes and zoom positions;

FIG. 18 is a diagram showing the relationship between lens latched positions which are determined by stepwise (divided) focal lengths and stepwise (divided) object distances and focus positions;

DETAILED DESCRIPTION OF THE PREFERRED EMBODIMENTS

Figure 1A:
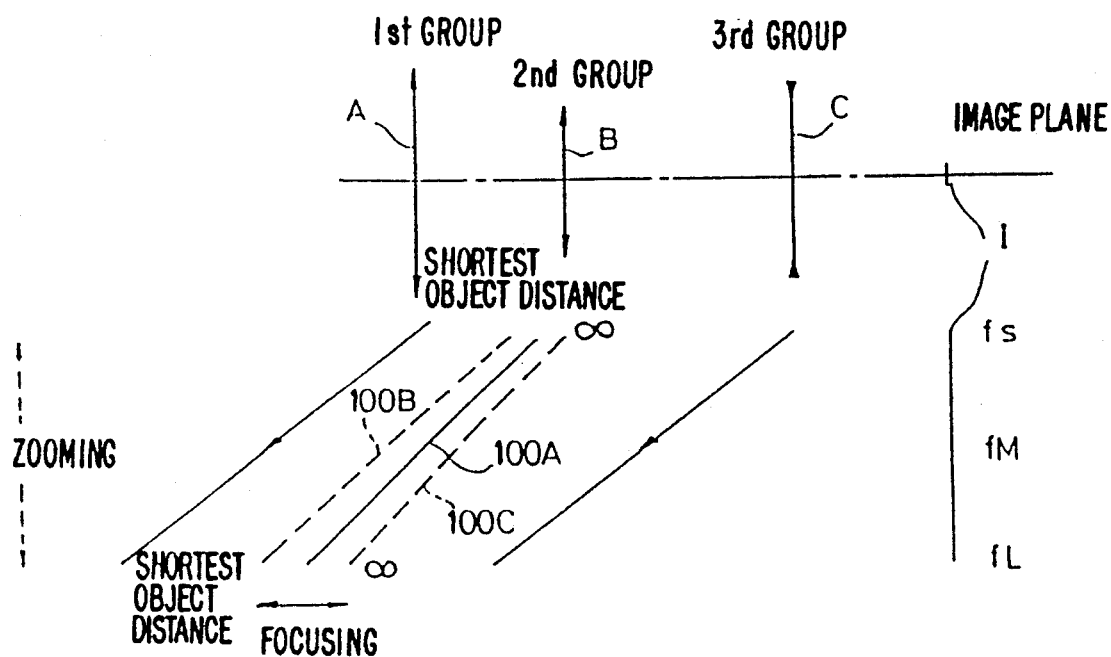
FIG. 1A is a schematic view showing tracks along which various lens groups move in a zoom lens, according to an aspect of the present invention.
Figure 1B:
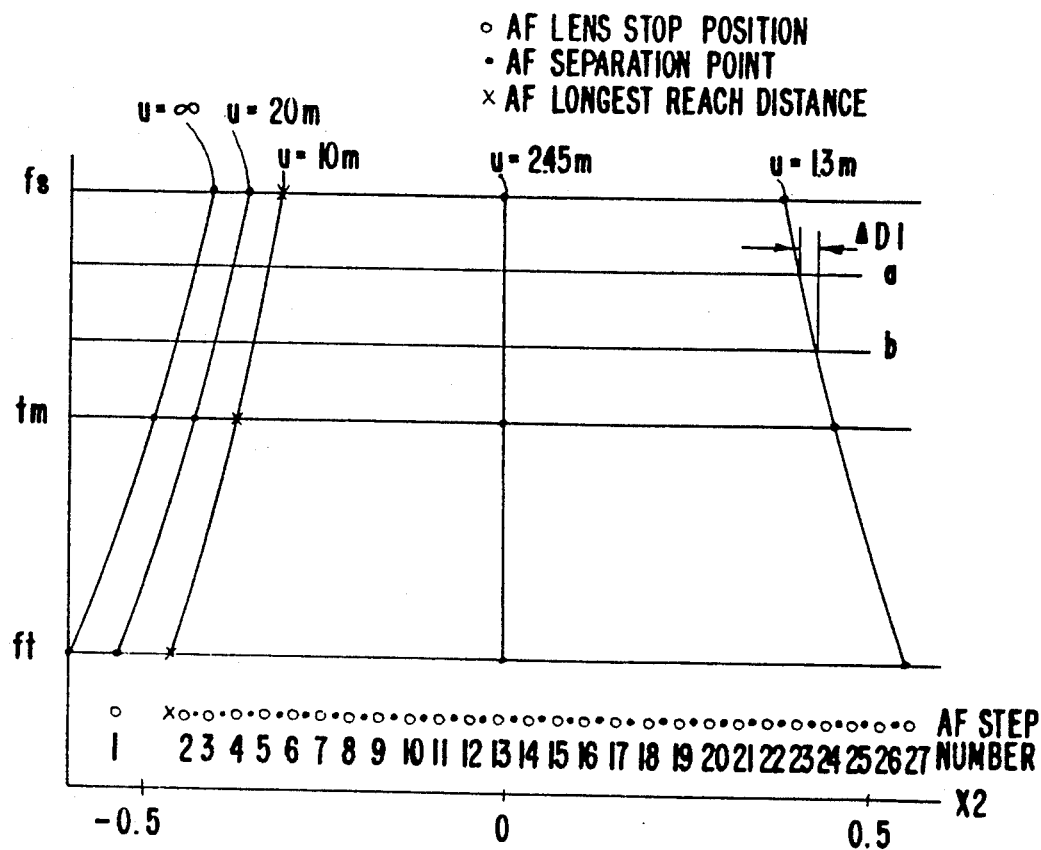
FIG. 1B is a diagram showing a relationship between a focal length and a displacement of a focusing lens group when a reference object distance is set to be about twice the closest object distance, in the zoom lens shown in FIG. 1A.
Figure 1C:
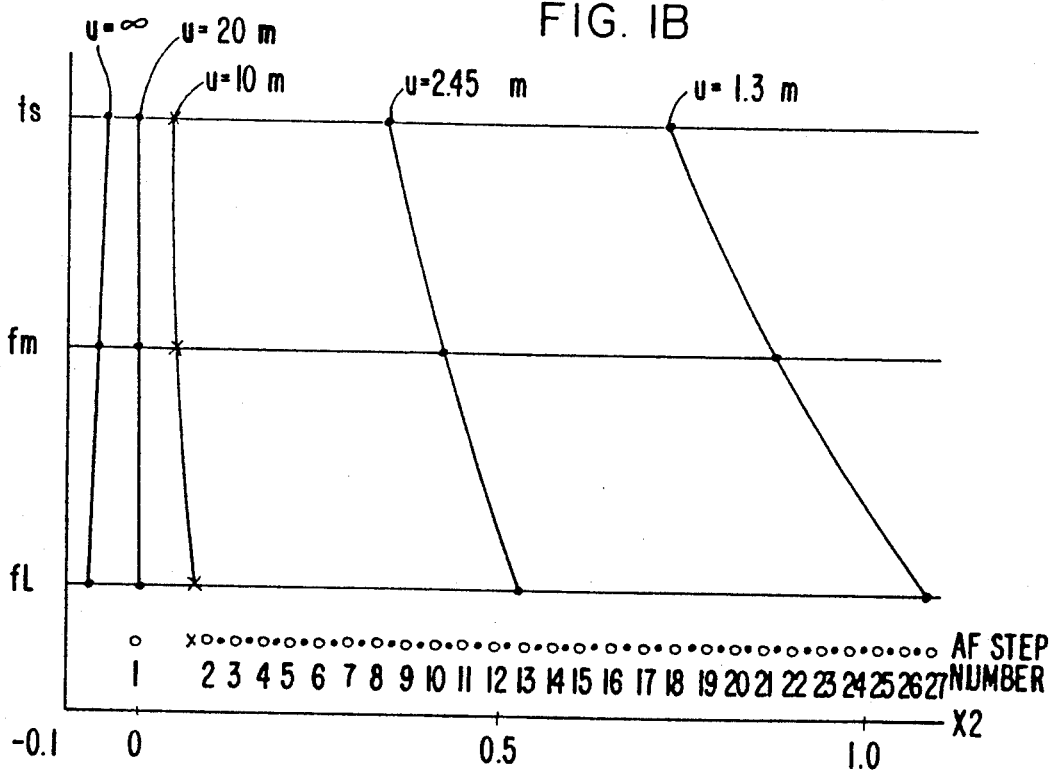
FIG. 1C is a diagram similar to FIG. 1B, but having a reference object distance which is about twice the longest distance which a measuring light emitted from an object distance measuring device reaches.
Figure 1D:
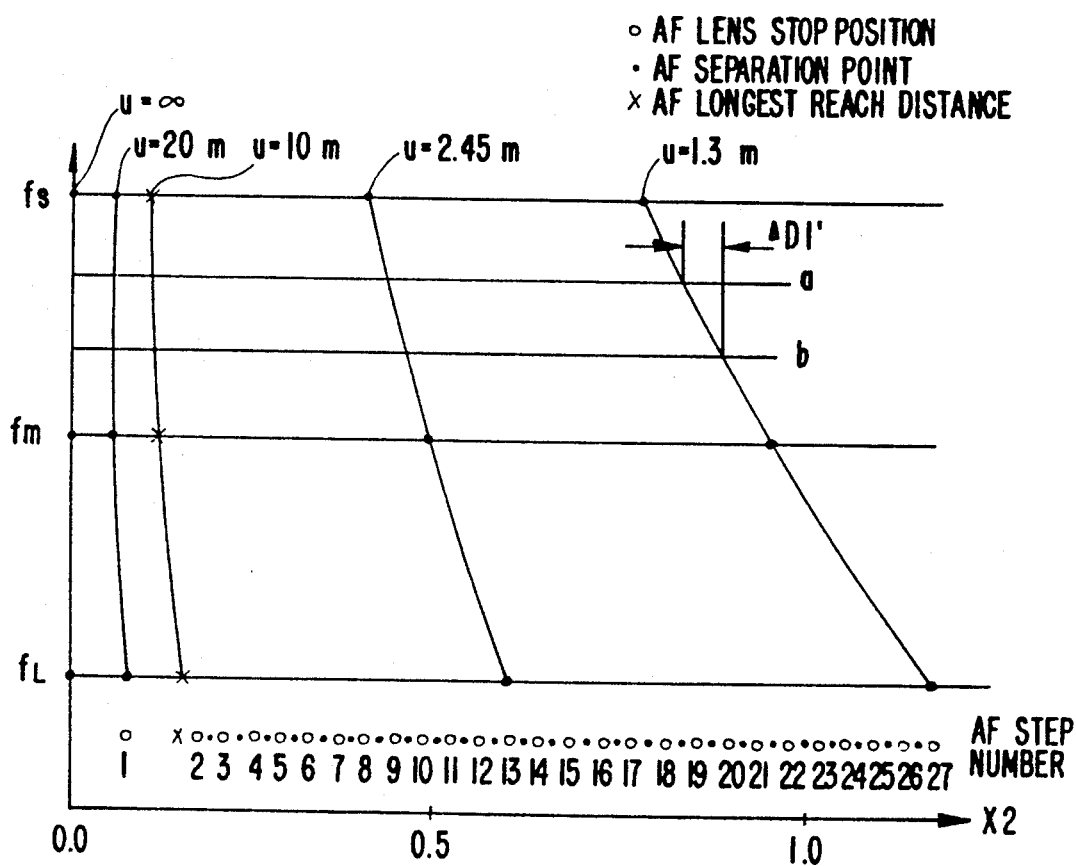
FIG. 1D is a diagram similar to FIG. 1B, but according to the prior art.

FIGS. 1A, 1B, and 1C show a first embodiment of the present invention. FIG. 1D represents the prior art, for reference. A zoom lens shown in FIGS. 1A, 1B, and 1C has three lens groups A, B, and C, of which the first lens group A and the second lens group B are positive lenses and the third lens group C is a negative lens. As shown in FIG. 1A, when the first and second lens groups A and B move away from an image plane I, and when the distance therebetween is changed, the focal length changes from a short focal length $f_S$ to a long focal length $f_L$ through an intermediate focal length $f_M$. The focusing can be effected by moving the second lens group B in the zooming range. The third lens group C, which is movable either together with or separately from the first lens group A, mainly functions to vary the magnification.

In the zoom lens mentioned above, the displacement of the focal point takes place during the zooming operation, so that the focusing lens group (second lens group) B is moved so as to adjust the displacement of the focal point. According to a basic concept of the present invention, a reference object distance at which no displacement of the focal point occurs during zooming is set at a finite object distance, so that the displacement of the focusing lens group necessary for the focusing operation can be determined based on a reference position corresponding to the position of the focusing lens group at the reference object distance, as shown by the solid line 100A in FIG. 1A. If the object is closer than the reference object distance, the focusing lens group B is moved to come closer to the object and if the object distance is farther than the reference object distance, the focusing lens group B is moved to go away from the object, as shown by dotted lines 100B and 100C, respectively, in FIG. 1A.

In existing shutter units, generally speaking, the focusing lens group is first held at an infinite ($\infty$) object distance upon setting the shutter and is moved, when the shutter button is pushed, to a position at which the focusing is in an "in focus" condition in accordance with the object distance and focal length.

In the present invention, on the other hand, the position at which the focusing lens group is held upon setting the shutter is not limited to a specific position. For example, if the focusing lens group is held at the reference object distance upon shutter setting, the speed of the focusing operation can be increased, particularly when the object is in the vicinity of the reference object distance.

FIG. 1B shows a graph of the relationship between the displacement of the focusing lens group B in the optical axis direction and the focal length when the reference object distance u is set to be approximately twice (i.e., 2.45 meters in the illustrated embodiment) the shortest object distance at which a picture can be taken. In FIG. 1B, the ordinate represents the focal length f and the abscissa represents the displacement of the focusing lens group B. The abscissa also represents the number of steps (divisions) or positions at which the focusing lens group B is stopped (which will be referred to as AF step number or AF lens latch step number hereinafter).

The lens stop positions are designated by the mark ◯, and a separation point which determines one of the two adjacent lens stop positions at which the focusing lens group is to be stopped is designated by the mark ●. The mark X stands for the greatest distance (about 10 meters in the illustrated embodiment) which the measuring light reaches. The positions ○ at which the focusing lens group B is to be stopped at the longest light-reaching distance depends on the focal length.

As can be seen in the graph shown in FIG. 1B, as long as the object distance u is equal to the reference object distance (u=2.45 m), the focusing lens group B is set at a specific fixed AF step number even if the focal length is varied by the zooming operation. That is, an "in focus" state is maintained during zooming. If the position of the object is detected to be closer than the reference object distance (e.g., u=1.30 m), then the focusing lens group B is moved to an AF step number (which depends on the focal length) on the closest object distance side. If the position of the object is detected to be farther than the reference object distance (e.g., u=10 m, 20 m or ∞), then the focusing lens group B is moved to an AF step number (which depends on the focal length) on the longest object distance side.

FIG. 1C shows a graph similar to FIG. 1B, but in which the reference object distance is set to be approximately twice (20 m in the illustrated embodiment) the longest object distance at which a picture can be taken, i.e., the longest distance which the measuring light can reach.

FIG. 1D shows a graph of the prior art, similar to the graph of FIG. 1B, but in which the reference object distance is set at infinity.

In an actual control process, according to the illustrated embodiment of the present invention, the focusing lens group B is stopped at any one of 27 AF step numbers in accordance with the focal length data of the zoom lens and object distance data of an object distance measuring device. The focal length data is detected in a stepwise fashion to represent a plurality of divided steps between the longest focal point and the shortest focal point. Supposing that the horizontal lines a and b, shown in FIGS. 1B and 1D, represent two adjacent focal lengths of divided steps and, for the purpose of simplification of the explanation, when the focusing lens group is stopped between the lines a and b, either of a and b is detected as focal length data. In the case in which the object distance is equal to 1.3 meters (u=1.3 m), the displacement of the focusing lens group B corresponding to the adjacent focal lengths a and b is Δ D1 in the illustrated embodiment of the invention in FIG. 1B. On the other hand, the displacement in the prior art, as illustrated in FIG. 1D, is Δ D1', which is larger than Δ D1 (ΔD1'>ΔD1). The amount of deviation due to the divided focal lengths is one-half Δ D1 or Δ D1, at the maximum and, accordingly, a higher degree of precision in focusing can be obtained in the present invention. In other words, to obtain a focusing precision substantially the same as that in the prior art, the number of divisions (steps) of the focal length can be decreased in the present invention.

As shown in FIG. 1C, when the reference object distance is set to be about twice the greatest distance which the measuring light reaches, focusing precision at the infinite object distance is substantially the same as that at the vicinity of the longest measuring light-reaching distance. In particular, for the object located at the greatest object distance, the focusing precision can be increased compared with the prior art shown in FIG. 1D.

In any event, the reference object distance can be set, taking into account the object distance at which the highest focusing precision is desired.

The zoom lens in which the second lens group B is used as the focusing lens group is characterized by the displacement of the focusing lens group which simply increases from the shortest focal length side to the longest focal length side (see FIG. 1A) and, accordingly, an equation which determines the displacement of the focusing lens group can be simplified.

Figure 1F:
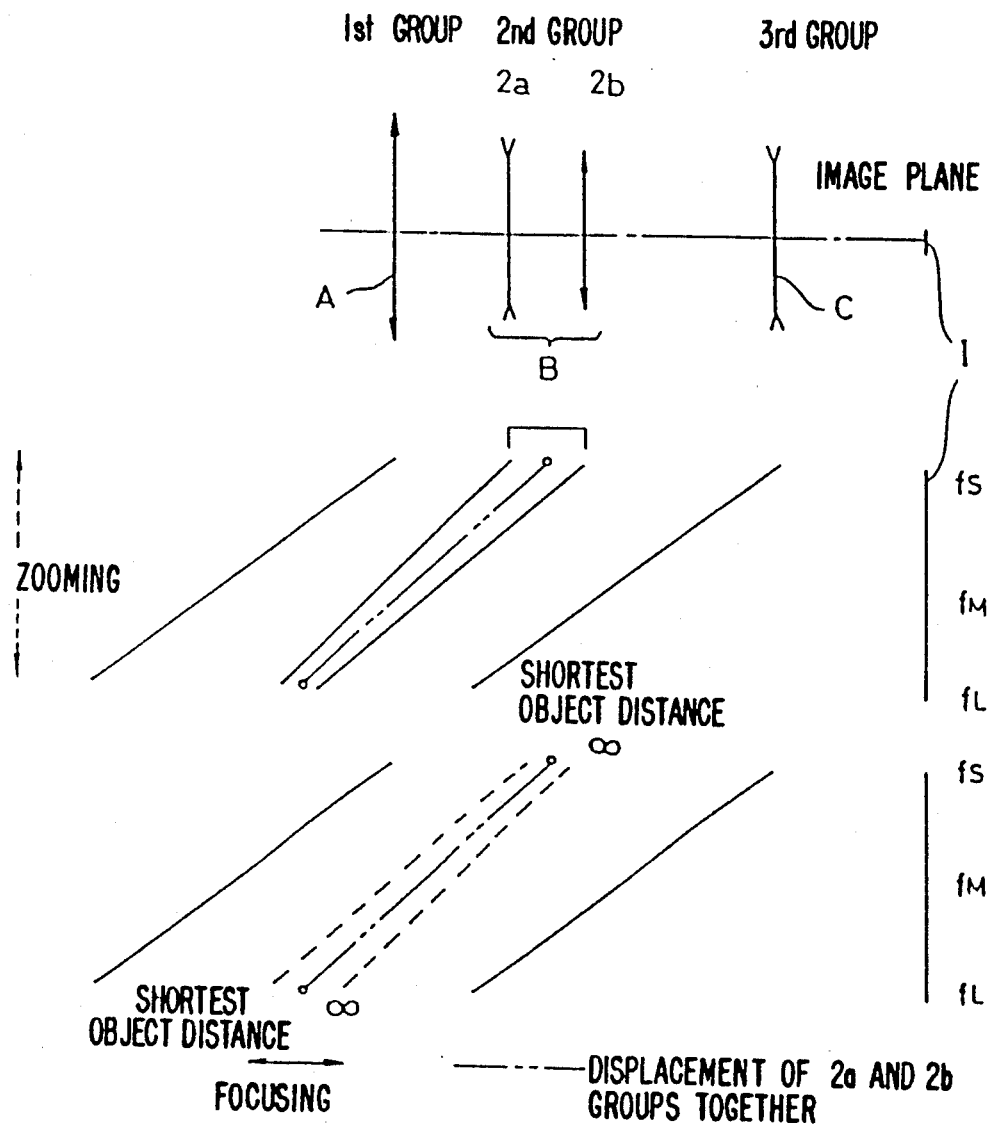
Figure 1G:
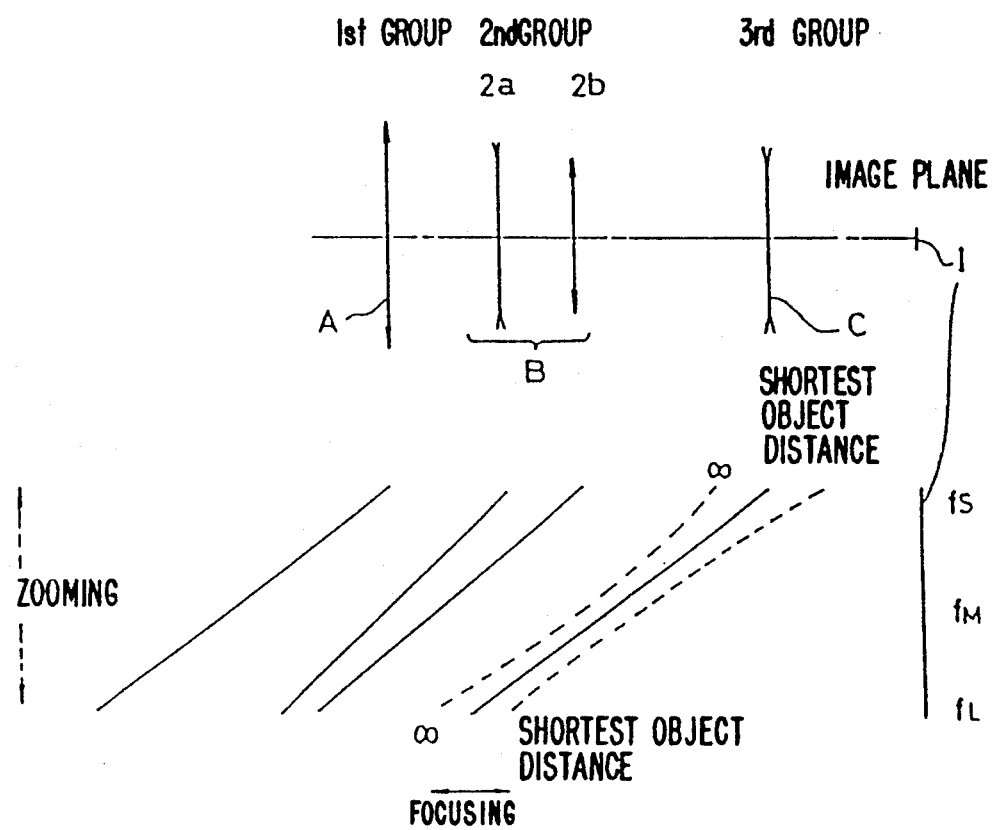
Figure 2A:
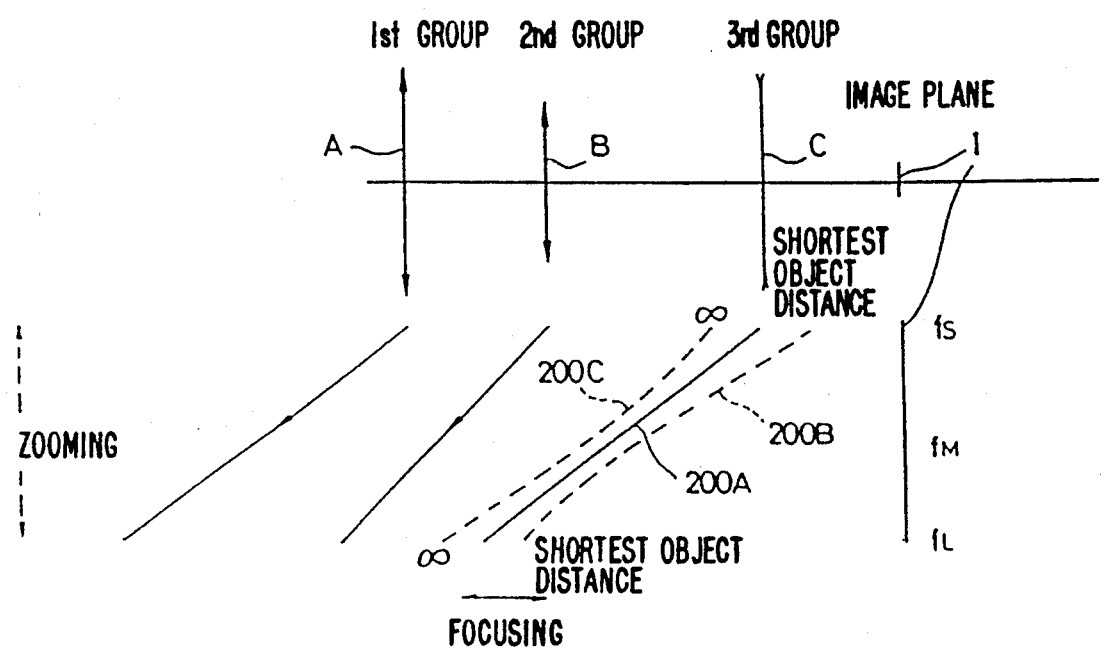
FIGS. 2A, 2B, and 2C are views corresponding to FIGS. 1A–1C, according to another embodiment of the present invention.
Figure 2B:
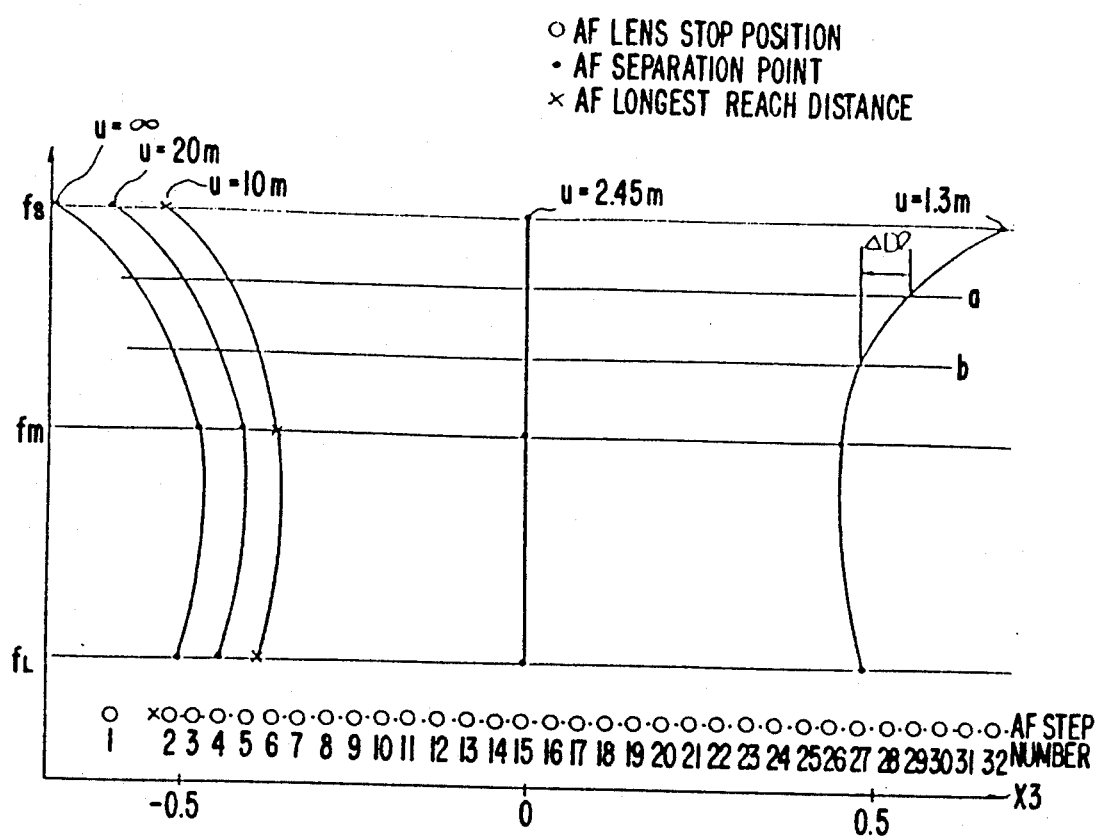
Figure 2C:
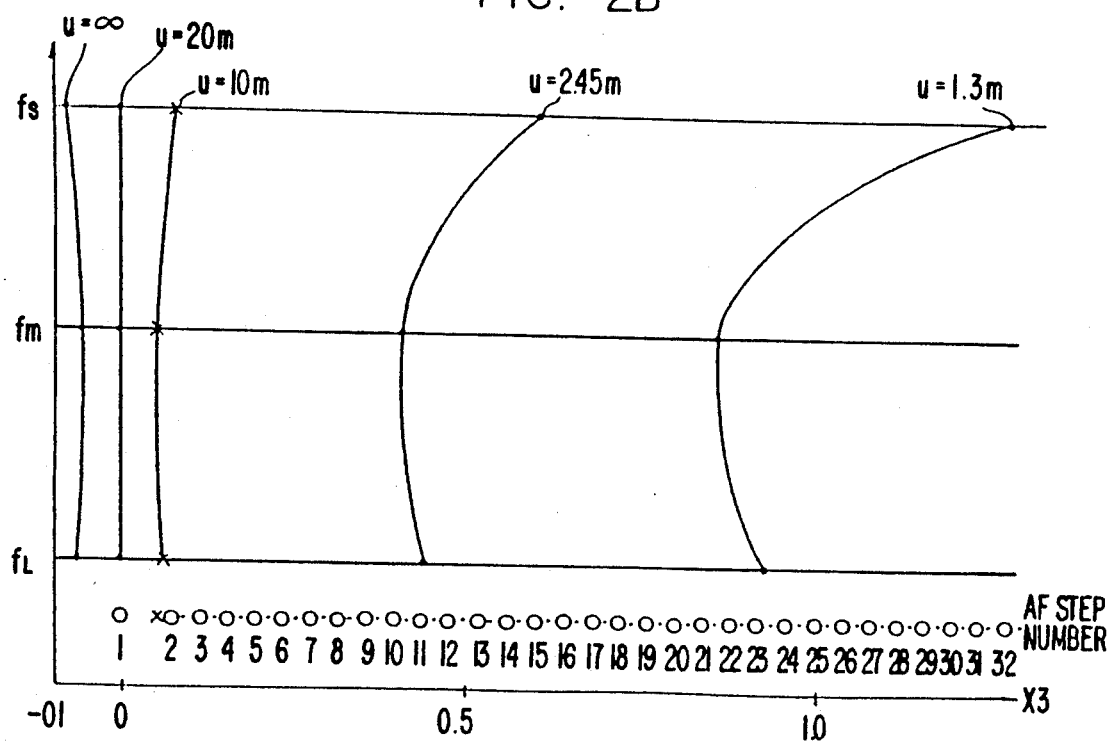
Figure 2D:
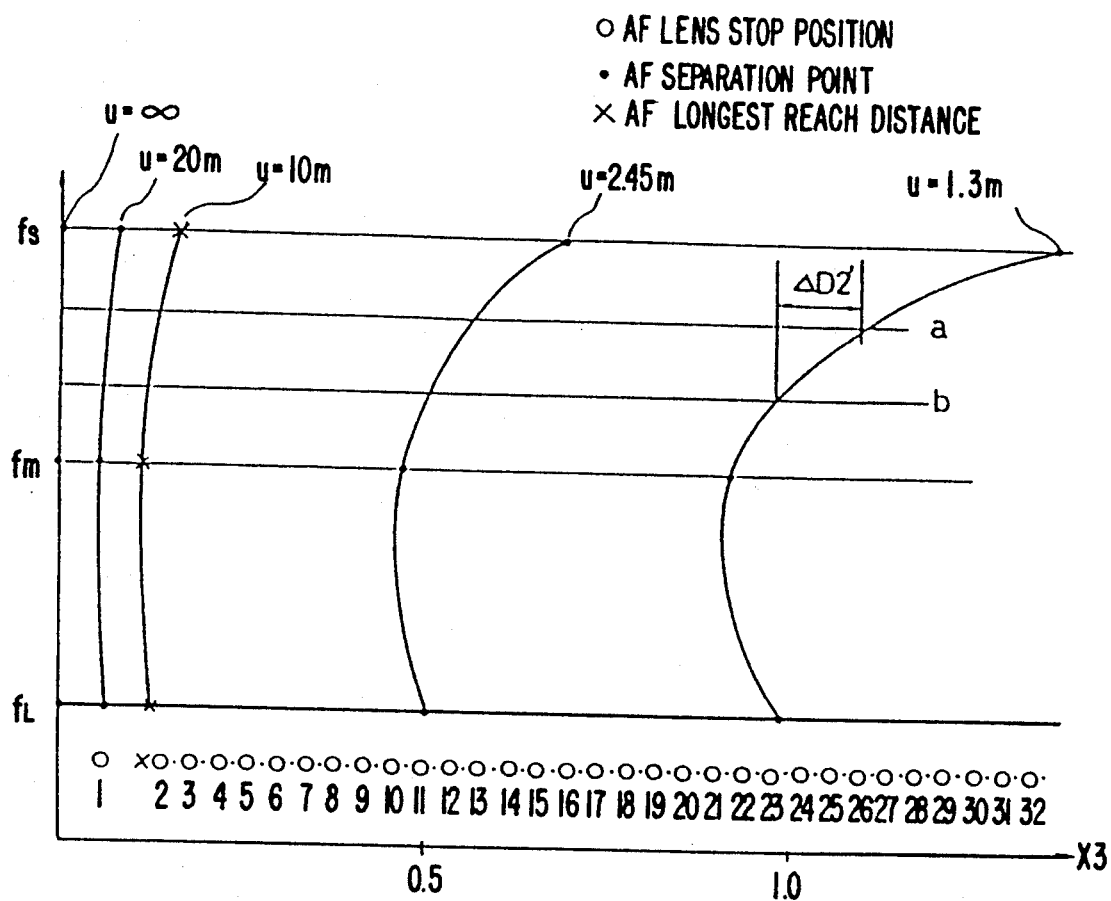
FIG. 2D corresponds to the prior art shown in FIG. 1D.

FIGS. 2A–2C show the second embodiment of a zoom lens of the present invention. FIG. 2D shows the prior art for the purpose of comparison. FIGS. 2A–2C correspond to FIGS. 1A–1, and FIG. 2D corresponds to FIG. 1D, respectively. The zoom lens according to the second embodiment has three lens groups, viz., a first lens group A, a second lens group B and a third lens group C, similar to the first embodiment. The first and second lens groups A and B are positive lenses, and the third lens group C is a negative lens. The difference between the first and second embodiments resides only in the negative third lens group which has a focusing function in addition to the magnifying function. The displacement of the lens groups can be decreased by changing the spatial distance between the first lens group A and the second lens group B.

In the zoom lens according to the second embodiment, the displacement of the focal point occurs when zooming is effected and the displacement can be absorbed by the control of the movement of the focusing lens group (third lens group) C. In the second embodiment, a reference object distance at which no displacement of the focal point occurs during zooming is set at a finite object distance, so that the displacement of the focusing lens group necessary for the focusing operation can be determined based upon a reference position corresponding to a position of the focusing lens group at the reference object distance, as shown by the solid line 200A in FIG. 2A. If the object distance is closer than the reference object distance, the focusing lens group B is moved away from the object and if the object distance is farther than the reference object distance, the focusing lens group B is moved toward the object, as shown at dotted lines 200B and 200C, respectively, in FIG. 2A.

Note that in FIGS. 2B and 2D, the displacement of the focusing lens group C at the divided focal lengths a and b are represented by Δ D2 (present invention shown in FIG. 2B) and Δ D2' (prior art shown in FIG. 2D), respectively Since the displacement of the focusing lens group is a minimum at an intermediate focal length in a zoom lens in which the third lens group constitutes the focusing lens group, the amount of deviation due to the divided focal lengths can be decreased in comparison with the first embodiment mentioned above by balancing the lens powers and the focal length ranges to make the displacements of the focusing lens group on the shortest focal length side and the longest focal length side substantially identical to each other.

Preferably, the division of the focal lengths is effected so that the circles of confusion at the divided points, due to the amount of deviation mentioned above with a full open aperture, becomes identical with each other. The diameter δ (f) of the circle of confusion is given by the following equation:

$$\delta(f) = K(f) \cdot X(f)/F(f)$$

wherein K(f) is the focus sensitivity of the focus lens group (sensitivity of focus displacement of the focal point relative to the displacement of the focusing lens group), F(f) is the open F number, and X(f) is the displacement error of the focusing lens group at the divided point.

As can be understood from the above equation, the focal length f can be determined so as to provide identical diameters $\delta$ (f) of the circles of confusion.

The number of divisions of the focal lengths should be determined by taking into consideration the fact that the division of the focal lengths on the longest focal length side is finer than that on the shortest focal length side in the second embodiment.

Examples of Zoom Lenses

The following Tables 1-3 (as well as Tables 4-5, Tables 6-8, Tables 9-10, Tables 11-12, Tables 13-15 and Tables 16-17) show examples of lens data, the distances between the first, second, and third lens groups A, B, and C, and the displacement of the focusing lens group B.

Figure 3A:
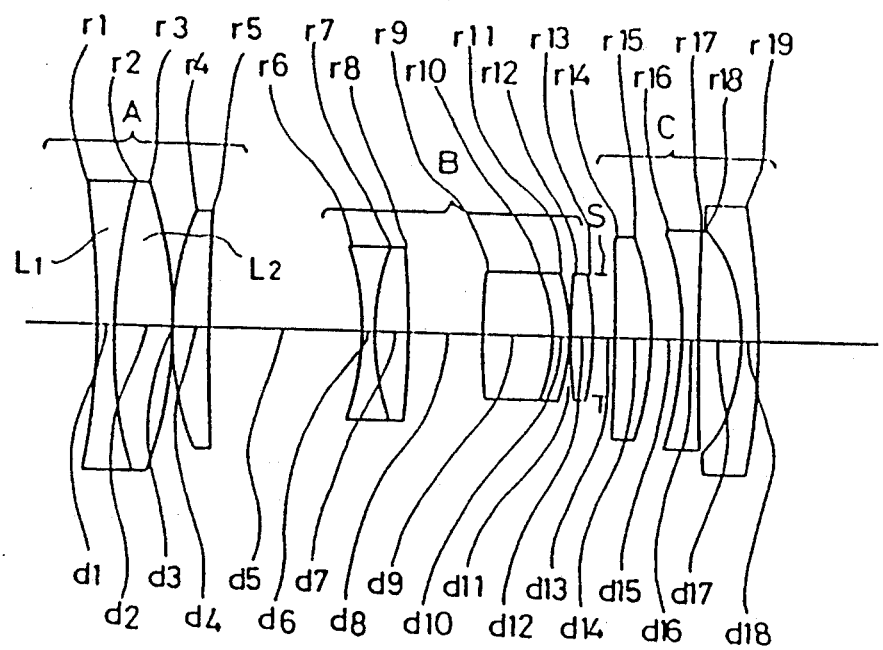
FIGS. 3A and 3B are schematic views showing arrangements of lenses of the zoom lens shown in FIG. 1A.
Figure 3B:
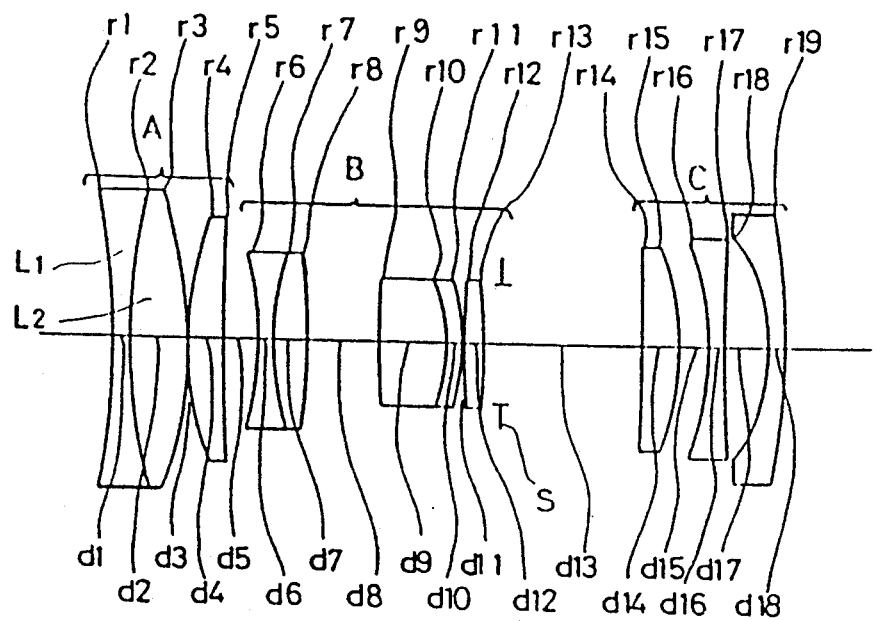

FIGS. 3A and 3B show a lens arrangement at the shortest focal length position and the longest focal length position, respectively. In FIGS. 3A and 3B, a diaphragm S is provided in the rear of the second lens group B.

Table 1 below shows lens data. In Table 1, $F_{NO}$ designates the F number, f the focal length, $\omega$ the half field angle, $f_B$ the back focus, r the radius of curvature of the lens surfaces, d the lens thickness or the lens distance, N the refractive index of the d-line of the lenses, $\nu$ the Abbe's number of the lenses, and $l_{1-2}$, $l_{2-3}$ the lens group distances. Note that the first lens L1 and the second lens L2 are directly adhered to each other at the second surface between the first and second lenses.

EXAMPLE 1

TABLE 1

| Lens Data | | | | |
|---|---|---|---|---|
| $F_{NO}$ = 1:4.0 ~ 6.5 ~ 8.3 | | | | |
| f = 39.10 ~ 70.00 ~ 102.00 | | | | |
| $\omega$ = 28.6° ~ 16.8° ~ 11.8° | | | | |
| $f_B$ = 8.80 ~ 30.76 ~ 49.64 | | | | |
| surface No. | r | d | N | $\nu$ |
| 1 | −69.545 | 1.50 | 1.83400 | 37.2 |
| 2 | 45.086 | 5.36 | 1.58913 | 61.2 |
| 3 | −38.751 | 0.10 | | |
| 4 | 29.731 | 3.28 | 1.51633 | 64.1 |
| 5 | 366.188 | $l_{1-2}$ | | |
| 6 | −24.887 | 1.20 | 1.83481 | 42.7 |
| 7 | 20.863 | 3.15 | 1.80518 | 25.4 |
| 8 | −83.189 | 6.54 | | |
| 9 | 70.905 | 6.37 | 1.51821 | 65.0 |
| 10 | −11.989 | 1.35 | 1.80518 | 25.4 |
| 11 | −22.083 | 0.10 | | |
| 12 | 156.086 | 2.00 | 1.58913 | 61.2 |
| 13 | −35.469 | $l_{2-3}$ | | |
| 14 | −152.335 | 2.99 | 1.80518 | 25.4 |
| 15 | −26.975 | 2.69 | | |
| 16 | −25.935 | 1.30 | 1.83400 | 37.2 |
| 17 | 243.658 | 3.85 | | |
| 18 | −16.323 | 1.40 | 1.77250 | 49.6 |
| 19 | −62.857 | | | |

TABLE 2

| | | Distance Between Lens Groups | | |
|---|---|---|---|---|
| f | object distance | $l_{1-2}$ | $l_{2-3}$ | $f_B$ |
| 39 | ∞ | 3.20 | 13.80 | 8.80 |

TABLE 2-continued

| | | Distance Between Lens Groups | | |
|---|---|---|---|---|
| f | object distance | $l_{1-2}$ | $l_{2-3}$ | $f_B$ |
| | 1.3 m | 2.42 | 14.58 | 8.80 |
| 70 | ∞ | 8.41 | 5.95 | 30.76 |
| | 1.3 m | 7.48 | 6.88 | 30.76 |
| 102 | ∞ | 13.93 | 2.00 | 49.64 |
| | 1.3 m | 12.77 | 3.16 | 49.64 |

TABLE 3

| | Displacement of Focusing Lens Group | | | | |
|---|---|---|---|---|---|
| f | ∞ | 20 m | 10 m | 2.45 m | 1.3 m |
| | reference object distance = ∞ | | | | |
| 39 | 0 | 0.049 | 0.098 | 0.406 | 0.778 |
| 70 | 0 | 0.059 | 0.118 | 0.487 | 0.936 |
| 102 | 0 | 0.073 | 0.146 | 0.604 | 1.162 |
| | reference object distance = 20 m | | | | |
| 39 | −0.049 | 0 | 0.049 | 0.357 | 0.729 |
| 70 | −0.059 | 0 | 0.059 | 0.429 | 0.878 |
| 102 | −0.073 | 0 | 0.073 | 0.532 | 1.090 |
| | reference object distance = 2.45 m | | | | |
| 39 | −0.406 | −0.357 | −0.308 | 0 | 0.372 |
| 70 | −0.487 | −0.429 | −0.370 | 0 | 0.449 |
| 102 | −0.604 | −0.532 | −0.459 | 0 | 0.558 |

EXAMPLE 2 The lens data in this example is the same as that of Table 1 in Example 1.

TABLE 4

| | | Distance Between Lens Groups | | |
|---|---|---|---|---|
| f | object distance | $l_{1-2}$ | $l_{2-3}$ | $f_B$ |
| 39 | ∞ | 3.20 | 13.80 | 8.80 |
| | 1.3 m | 3.20 | 15.17 | 7.43 |
| 70 | ∞ | 8.41 | 5.95 | 30.76 |
| | 1.3 m | 8.41 | 6.86 | 29.85 |
| 102 | ∞ | 13.93 | 2.00 | 49.64 |
| | 1.3 m | 13.93 | 2.99 | 48.65 |

TABLE 5

| | Displacement of Focusing Lens Group | | | | |
|---|---|---|---|---|---|
| f | ∞ | 20 m | 10 m | 2.45 m | 1.3 m |
| | reference object distance = ∞ | | | | |
| 39 | 0 | 0.081 | 0.162 | 0.692 | 1.373 |
| 70 | 0 | 0.056 | 0.112 | 0.469 | 0.917 |
| 102 | 0 | 0.059 | 0.119 | 0.503 | 0.998 |
| | reference object distance = 20 m | | | | |
| 39 | −0.081 | 0 | 0.081 | 0.611 | 1.292 |
| 70 | −0.056 | 0 | 0.056 | 0.413 | 0.861 |
| 102 | −0.059 | 0 | 0.060 | 0.444 | 0.929 |
| | reference object distance = 2.45 m | | | | |
| 39 | −0.692 | −0.611 | −0.530 | 0 | 0.681 |
| 70 | −0.469 | −0.413 | −0.357 | 0 | 0.448 |
| 102 | −0.503 | −0.444 | −0.384 | 0 | 0.485 |

In Examples 1 and 2 given above, the first, second and third lens groups A, B, and C are independently movable, and the focusing can be effected by the second lens group B, as can be understood from the lens distances. The following discussion will be directed to a type in which the first lens group A and the third lens group C move together.

Example 3 shows a type in which the focusing is effected by the second lens group B, Example 4 a type in which the focusing is effected by the third lens group C, and Example 5 a type in which the focusing is effected by the first and third lens groups A and C.

Examples 3 and 4 correspond to FIGS. 1A and 2A, respectively. The track of the movement of the lens for Example 5 is shown in FIG. 1E.

The lens data which is common to Examples 3–5 is shown in Table 6. Note that in Table 2, the first lens L1 and the second lens L2 are not adhered to each other, unlike in Table 1.

EXAMPLE 3

TABLE 6

$F_{NO} = 1:4.0 \sim 6.2 \sim 8.2$
$f = 39.00 \sim 70.00 \sim 102.00$
$\omega = 28.8° \sim 16.8° \sim 11.8°$
$f_B = 8.80 \sim 29.00 \sim 49.28$

| surface No. | r | d | N | $\nu$ |
|---|---|---|---|---|
| 1 | −70.000 | 1.500 | 1.83400 | 37.2 |
| 2 | 48.131 | 0.338 | | |
| 3 | 43.517 | 5.338 | 1.58913 | 61.2 |
| 4 | −43.517 | 0.100 | | |
| 5 | 31.486 | 3.153 | 1.58913 | 61.2 |
| 6 | 164.560 | $l_{1\sim 2}$ | | |
| 7 | −25.613 | 1.200 | 1.83481 | 42.7 |
| 8 | 21.482 | 3.109 | 1.80518 | 25.4 |
| 9 | −83.963 | 6.198 | | |
| 10 | 50.639 | 6.700 | 1.51633 | 64.1 |
| 11 | −11.927 | 1.350 | 1.80518 | 25.4 |
| 12 | −22.599 | 0.100 | | |
| 13 | 175.675 | 2.000 | 1.58913 | 61.2 |
| 14 | −35.086 | $l_{2\sim 3}$ | | |
| 15 | −134.181 | 3.981 | 1.80518 | 25.4 |
| 16 | −23.348 | 1.701 | | |
| 17 | −23.820 | 1.300 | 1.83400 | 37.2 |
| 18 | 275.596 | 3.972 | | |
| 19 | −15.441 | 1.400 | 1.77250 | 49.6 |
| 20 | −60.088 | | | |
| 17 | −23.820 | 1.300 | 1.83400 | 37.2 |
| 18 | 275.596 | 3.972 | | |
| 19 | −15.441 | 1.400 | 1.77250 | 49.6 |
| 20 | −60.088 | | | |

TABLE 7

| | | Distance Between Lens Groups | | |
|---|---|---|---|---|
| f | object distance | $l_{1\sim 2}$ | $l_{2\sim 3}$ | $f_B$ |
| 39 | ∞ | 3.50 | 13.26 | 8.80 |
| | 1.3 m | 2.79 | 13.97 | 8.80 |
| 70 | ∞ | 10.98 | 5.78 | 29.00 |
| | 1.3 m | 10.07 | 6.69 | 29.00 |
| 102 | ∞ | 14.46 | 2.30 | 49.28 |
| | 1.3 m | 13.41 | 3.35 | 49.28 |

TABLE 8

| | Displacement of Focusing Lens Group | | | | |
|---|---|---|---|---|---|
| f | ∞ | 20 m | 10 m | 2.45 m | 1.3 m |
| | reference object distance = ∞ | | | | |
| 39 | 0 | 0.045 | 0.090 | 0.372 | 0.714 |
| 70 | 0 | 0.057 | 0.115 | 0.478 | 0.918 |
| 102 | 0 | 0.065 | 0.131 | 0.546 | 1.053 |
| | reference object distance = 2.45 m | | | | |
| 39 | −0.372 | −0.327 | −0.282 | 0 | 0.342 |
| 70 | −0.478 | −0.421 | −0.363 | 0 | 0.440 |
| 102 | −0.546 | −0.481 | −0.415 | 0 | 0.507 |

EXAMPLE 4

TABLE 9

| | | Distance Between Lens Groups | | |
|---|---|---|---|---|
| f | object distance | $l_{1\sim 2}$ | $l_{2\sim 3}$ | $f_B$ |
| 39 | ∞ | 3.36 | 13.26 | 8.85 |
| | 1.3 m | 3.36 | 14.48 | 7.64 |
| 70 | ∞ | 10.98 | 5.78 | 29.00 |
| | 1.3 m | 10.98 | 6.69 | 28.08 |
| 102 | ∞ | 14.46 | 2.30 | 49.28 |

TABLE 9-continued

| | | Distance Between Lens Groups | | |
|---|---|---|---|---|
| f | object distance | $l_{1\sim 2}$ | $l_{2\sim 3}$ | $f_B$ |
| | 1.3 m | 14.46 | 3.23 | 48.36 |

TABLE 10

| | Displacement of Focusing Lens Group | | | | |
|---|---|---|---|---|---|
| f | ∞ | 20 m | 10 m | 2.45 m | 1.3 m |
| | reference object distance = ∞ | | | | |
| 39 | 0 | 0.072 | 0.145 | 0.614 | 1.212 |
| 70 | 0 | 0.056 | 0.112 | 0.471 | 0.918 |
| 102 | 0 | 0.056 | 0.112 | 0.472 | 0.926 |
| | reference object distance = 2.45 m | | | | |
| 39 | −0.614 | −0.542 | −0.469 | 0 | 0.598 |
| 70 | −0.471 | −0.415 | −0.359 | 0 | 0.447 |
| 102 | −0.472 | −0.416 | −0.360 | 0 | 0.454 |

EXAMPLE 5

TABLE 11

| | | Distance Between Lens Groups | | |
|---|---|---|---|---|
| f | object distance | $l_{1\sim 2}$ | $l_{2\sim 3}$ | $f_B$ |
| 39 | ∞ | 3.50 | 13.26 | 8.80 |
| | 1.3 m | 1.68 | 15.08 | 6.98 |
| 70 | ∞ | 10.98 | 5.78 | 29.00 |
| | 1.3 m | 9.79 | 6.97 | 27.80 |
| 102 | ∞ | 14.46 | 2.30 | 49.28 |
| | 1.3 m | 13.26 | 3.50 | 48.08 |

TABLE 12

| | Displacement of Focusing Lens Group | | | | |
|---|---|---|---|---|---|
| f | ∞ | 20 m | 10 m | 2.45 m | 1.3 m |
| | reference object distance = ∞ | | | | |
| 39 | 0 | 0.110 | 0.220 | 0.926 | 1.824 |
| 70 | 0 | 0.075 | 0.150 | 0.623 | 1.194 |
| 102 | 0 | 0.075 | 0.150 | 0.623 | 1.199 |
| | reference object distance = 2.45 m | | | | |
| 39 | −0.926 | −0.816 | −0.726 | 0 | 0.898 |
| 70 | −0.623 | −0.548 | −0.473 | 0 | 0.571 |
| 102 | −0.623 | −0.548 | −0.473 | 0 | 0.576 |

The following examples are directed to a modified three lens group type in which the second lens group B has two sub-groups B1 and B2 which are independently moved along the respective tracks when zooming is effected. Focusing is effected by moving the sub-groups B1 and B2 together (Example 6) or by moving the third lens group C (Example 7). FIGS. 1F and 1G show tracks of movement of the lenses in Examples 6 and 7, respectively.

The lens data which is common to Examples 6 and 7 is shown in Table 13. In Table 13, the first lens L1 and the second lens L2 are adhered to each other. Note that in Table 13, the radii of curvature of the second and third surfaces are identical to each other, and the distance d therebetween is zero.

EXAMPLE 6

TABLE 13

$F_{NO} = 1:4.1 \sim 6.5 \sim 8.2$
$f = 39.00 \sim 70.00 \sim 102.00$
$\omega = 28.7° \sim 16.8° \sim 11.8°$
$f_B = 8.80 \sim 29.73 \sim 48.20$

| surface No. | r | d | N | $\nu$ |
|---|---|---|---|---|
| 1 | −107.000 | 1.50 | 1.83400 | 37.2 |
| 2 | 38.413 | 0.00 | | |

TABLE 13-continued

| | | | | |
|---|---|---|---|---|
| 3 | 38.413 | 5.23 | 1.51633 | 64.1 |
| 4 | −40.606 | 0.10 | | |
| 5 | 29.795 | 3.04 | 1.62041 | 60.3 |
| 6 | 135.495 | | | $l_{1\sim2}$ |
| 7 | −26.035 | 1.20 | 1.83481 | 42.7 |
| 8 | 20.155 | 3.29 | 1.80518 | 25.4 |
| 9 | −89.454 | | | $l_{2a\sim2b}$ |
| 10 | 60.814 | 6.70 | 1.51821 | 65.0 |
| 11 | −11.768 | 1.35 | 1.80518 | 25.4 |
| 12 | −22.113 | 0.10 | | |
| 13 | 140.662 | 2.00 | 1.58913 | 61.2 |
| 14 | −36.015 | | | $l_{2a\sim3}$ |
| 15 | −135.273 | 2.99 | 1.80518 | 25.4 |
| 16 | −25.386 | 2.49 | | |
| 17 | −25.912 | 1.30 | 1.83400 | 37.2 |
| 18 | 179.516 | 4.34 | | |
| 19 | −14.965 | 1.40 | 1.77250 | 49.6 |
| 20 | −49.329 | | | |

TABLE 14

Distance Between Lens Groups

| f | object distance | $l_{1\sim2}$ | $l_{2a\sim2b}$ | $l_{2b\sim3}$ | $f_B$ |
|---|---|---|---|---|---|
| 39 | ∞ | 3.20 | 6.84 | 13.13 | 8.80 |
| | 1.3 m | 2.47 | 6.84 | 13.86 | 8.80 |
| 70 | ∞ | 9.41 | 5.96 | 5.68 | 29.73 |
| | 1.3 m | 8.50 | 5.96 | 6.59 | 29.73 |
| 102 | ∞ | 14.71 | 4.97 | 2.03 | 48.20 |
| | 1.3 m | 13.59 | 4.97 | 3.15 | 48.20 |

TABLE 15

Displacement of Focusing Lens Group reference object distance = ∞

| f | ∞ | 20 m | 10 m | 2.45 m | 1.3 m |
|---|---|---|---|---|---|
| 39 | 0 | 0.046 | 0.092 | 0.379 | 0.727 |
| 70 | 0 | 0.057 | 0.114 | 0.472 | 0.908 |
| 102 | 0 | 0.070 | 0.140 | 0.580 | 1.119 | reference object distance = 2.45 m

| 39 | −0.379 | −0.333 | −0.287 | 0 | 0.348 |
| 70 | −0.472 | −0.415 | −0.358 | 0 | 0.436 |
| 102 | −0.580 | −0.510 | −0.440 | 0 | 0.539 |

EXAMPLE 7

TABLE 16

Distance Between Lens Groups

| f | object distance | $l_{1\sim2}$ | $l_{2a\sim2b}$ | $l_{2b\sim3}$ | $f_B$ |
|---|---|---|---|---|---|
| 39 | ∞ | 3.20 | 6.84 | 13.13 | 8.80 |
| | 1.3 m | 3.20 | 6.84 | 14.42 | 7.51 |
| 70 | ∞ | 9.41 | 5.96 | 5.68 | 29.73 |
| | 1.3 m | 9.41 | 5.96 | 6.60 | 28.81 |
| 102 | ∞ | 14.71 | 4.97 | 2.03 | 48.20 |
| | 1.3 m | 14.71 | 4.97 | 3.02 | 47.21 |

TABLE 17

Displacement of Focusing Lens Group

| f | ∞ | 20 m | 10 m | 2.45 m | 1.3 m |
|---|---|---|---|---|---| reference object distance = ∞

| 39 | 0 | 0.076 | 0.153 | 0.651 | 1.287 |
| 70 | 0 | 0.056 | 0.112 | 0.472 | 0.921 |
| 102 | 0 | 0.060 | 0.120 | 0.505 | 0.992 | reference object distance = 2.45 m

| 39 | −0.651 | −0.575 | −0.498 | 0 | 0.636 |
| 70 | −0.472 | −0.416 | −0.360 | 0 | 0.449 |
| 102 | −0.505 | −0.445 | −0.385 | 0 | 0.487 |

Zoom Lens Barrel

Figure 4A:
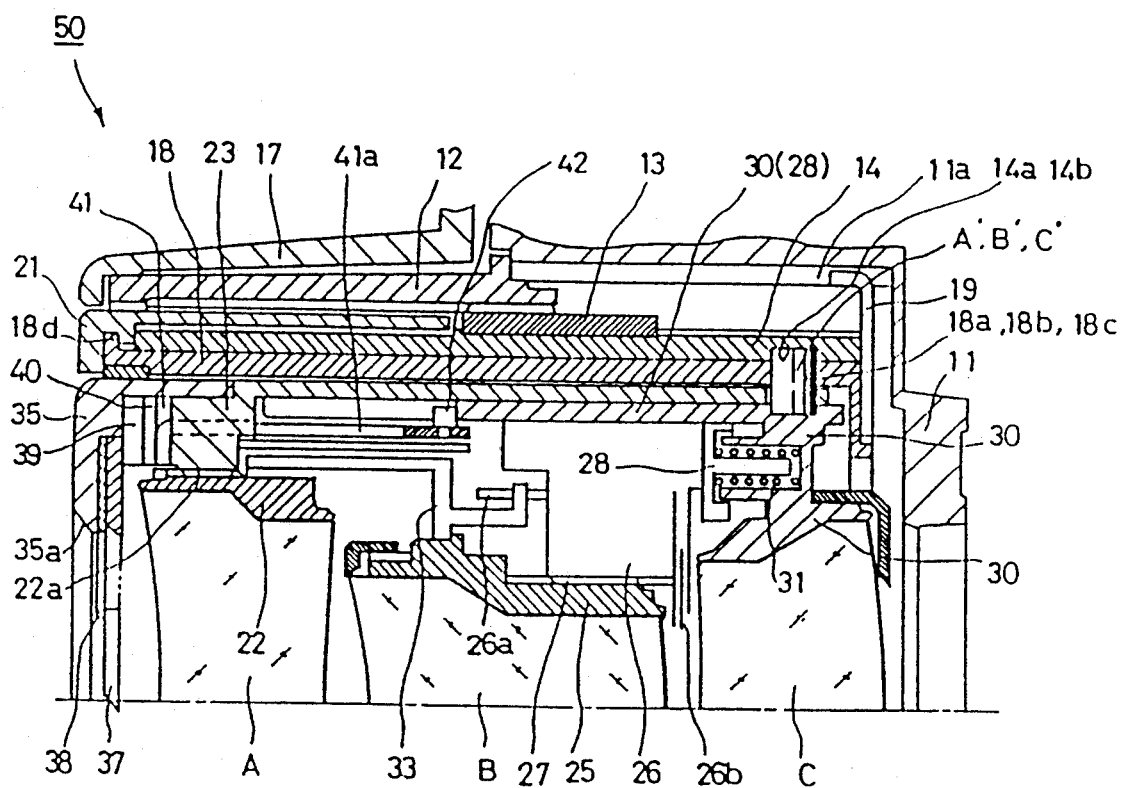
FIGS. 4A, 4B, and 4C are longitudinal sectional views of the upper half of a lens barrel having a zoom lens shown in FIG. 1A, shown at three different positions (lens retracted position, shortest focal length position, and longest focal length position)
Figure 4B:
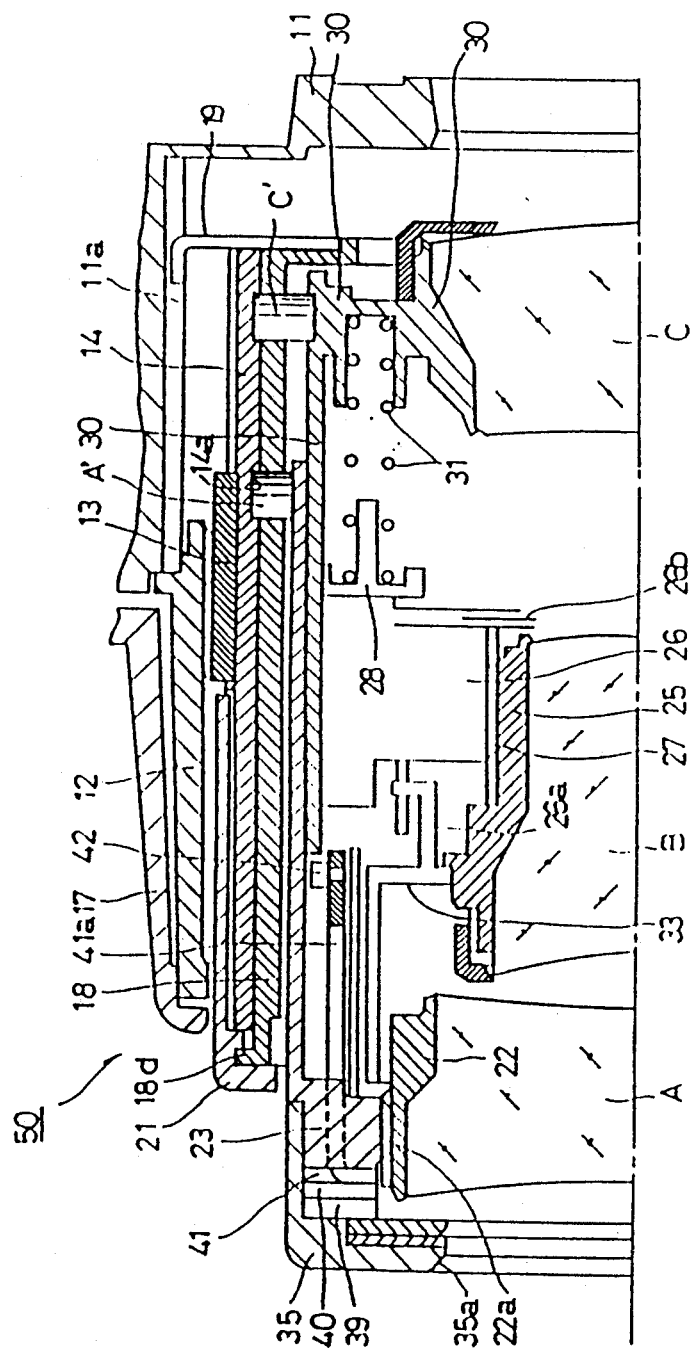
Figure 4C:
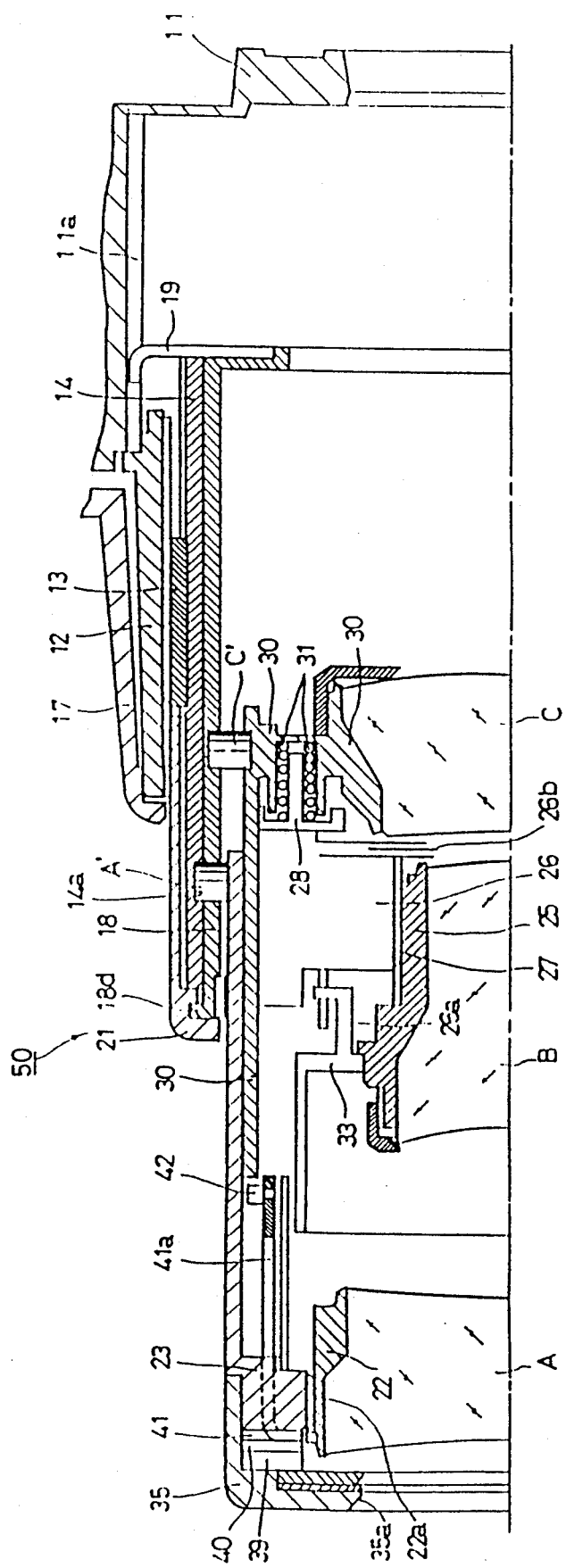

The following discussion will be directed to a zoom lens barrel 50 having a zoom lens, shown in Example 3, in which the first lens group A and the third lens group C are moved together to effect zooming and the focusing is effected by the second lens group B. In the illustrated zoom lens barrel 50, the zoom lens can be completely accommodated within the lens barrel (camera body) in a retracted position in which the zoom lens is in the inoperative position. FIGS. 4A, 4B, and 4C show the retracted position, the shortest focal length position (WIDE), and the longest focal length position (TELE), respectively.

The zoom lens barrel 50 operates as follows:

The first lens group A and the third lens group C move together between a wide extremity shown in FIG. 4B and a tele extremity shown in FIG. 4C, so that when zooming is effected, the second lens group B is moved relative to the first and third lens groups A and C to change the spatial distance therebetween. Focusing can be effected by the second lens group B, similar to the relationship shown in FIG. 1A. In the zoom lens barrel in the illustrated embodiment, when the first, second, and third lens groups A, B, and C are moved backward from the wide extremity shown in FIG. 4B to the retracted position shown in FIG. 4A, the first lens group A and the third lens group C are independently movable for the purpose of completely accommodating the zoom lens in the camera body. Namely, the first lens group A and the second lens group B can be moved to come closer to the third lens group C.

A stationary ring 11 which is secured to the camera body has a female helicoid 12 secured thereto. The female helicoid 12 is engaged by male helicoid 13 to which a cam ring 14 is secured. With additional reference to FIG. 5, the cam ring 14 has a gear 15 connected thereto which is engaged by pinion 16a of a zoom motor 16, so that when the zoom motor 16 is driven, the cam ring 14 moves in the direction of the optical axis by the lead of the male helicoid 13. The gear 15 is preferably inclined in the same direction as the threads of the male helicoid 13. Front cover 17 covers the female helicoid 12.

In the inner periphery of the cam ring 14 is fitted a linearly movable ring 18 which is provided on its rear portion with a linear movement guide plate 19 secured thereto. A part of the outer peripheral portion of the guide plate 19 is engaged in a linear movement guide groove 11a formed in the stationary ring 11. The linearly movable ring 18 is provided on its front end with an outer flange 18d, so that the cam ring 14 is rotatably fitted between the outer flange 18d and the linear movement guide plate 19 so as not to move in the direction of the optical axis. Consequently, the linearly movable ring 18, which is prevented from being rotated by the guide plate 19, can always be moved together by the cam ring 14 in the optical axis direction. The cam ring 14 is rotatable relative to the linearly movable ring 18. The outer flange 18d has a lens cover barrel 21 secured thereto.

A first lens frame 22, to which the first lens group A is secured, is connected to a first lens moving ring 23 through an adjusting screw 22a. The adjusting screw is adapted to effect a zooming adjustment (an adjustment to prevent the displacement of the focal point when the zooming is effected at the reference object distance) upon assembly. The first lens moving ring 23 is provided on its rear portion with rollers A′ (which will be referred to as first group rollers hereinafter) for the first lens group A. The first group rollers A′ extend through linear movement guide grooves 18a to be fitted in first cam grooves 14a of the cam ring 14 for the first lens group A. See FIGS. 5 and 6.

A second lens frame 25 is engaged to the second lens group B by an inner peripheral helicoid 27 of a shutter block 26, which is secured to a second lens moving ring 28. On the rear end of the second lens moving ring 28 are provided rollers B' (which will be referred to as second group rollers hereinafter) for the second lens group B which extend through linear movement guide grooves 18b (FIGS. 5 and 6) formed in the linearly movable ring 18 to be fitted in second cam grooves 14b of the cam ring 14 for the second lens group B.

A third lens frame 30 to which the third lens group C is secured has rollers C' (which will be referred to as third group rollers hereinafter) for the third lens group C which are fitted in linear movement guide grooves 18c of the linearly movable ring 18. Note that the third group rollers C' are not fitted in the cam grooves of cam ring 14, unlike the first and second group rollers A' and B'.

Figure 6:
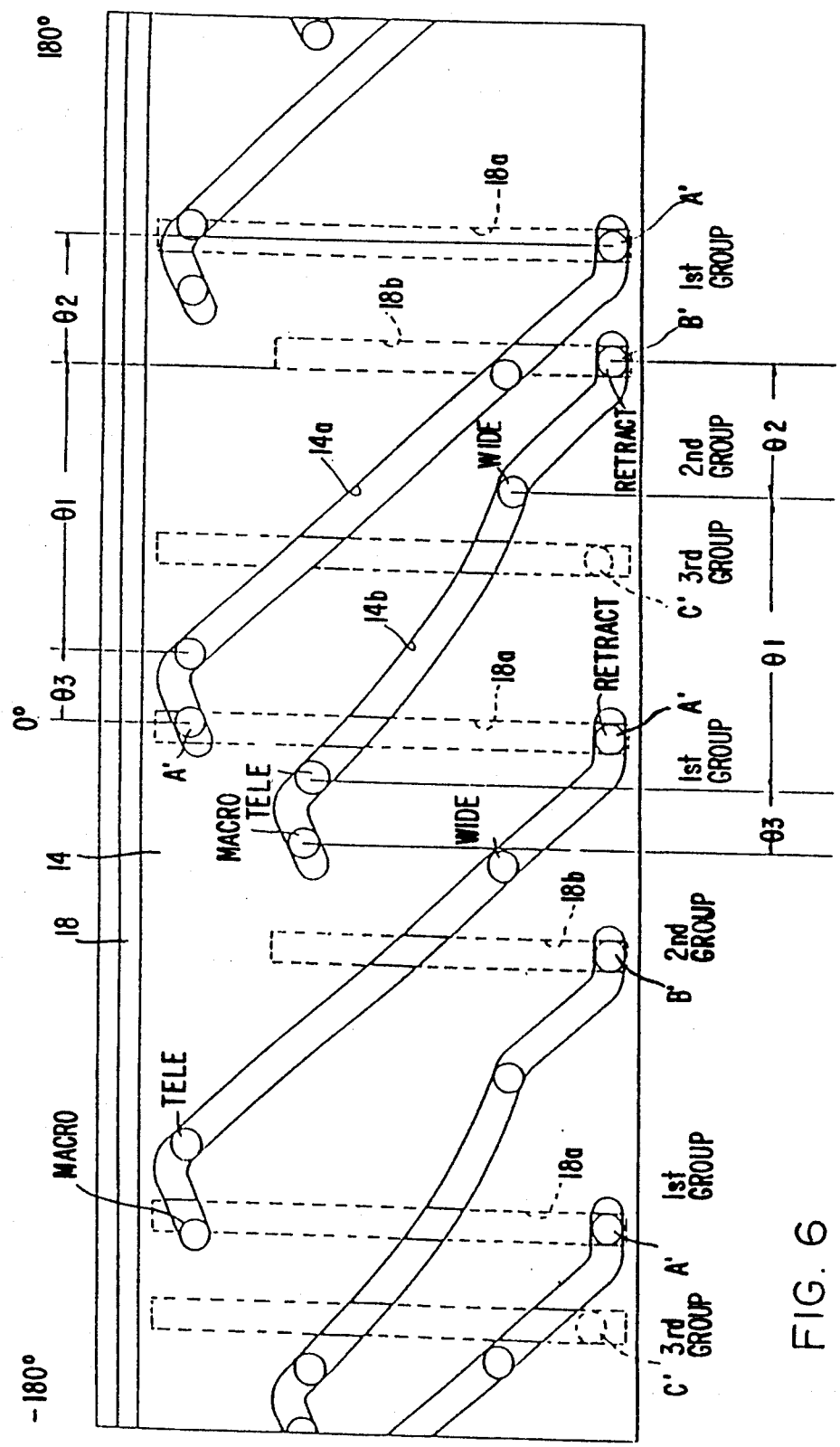
FIG. 6 is an expanded view of a cam ring and a linearly movable ring in connection with rollers of first, second and third lens groups in a zoom lens shown in FIGS. 4A–4C.

The first cam grooves 14a and the second cam grooves 14b have "accommodating" sections $\theta 2$, for moving the zoom lens barrel to the retracted position, and macro transferring sections $\theta 3$ which are located on the opposite sides of respective zooming sections $\theta 1$, as shown in FIG. 6. The zooming sections $\theta 1$ are also shown in FIG. 1A. The accommodating sections $\theta 2$ are adapted to retract the first, second, and third lens groups A, B, and C beyond the wide extremity toward the camera body. The macro transferring sections $\theta 3$ are adapted to advance the first, second, and third lens groups A, B, and C together by a slight displacement from the tele extremity in order to bring them into a macro photographing position. The inclination angles of the first cam grooves 14a and the second cam grooves 14b are relatively small and the directions of inclination of these cam grooves 14a and 14b in the macro transferring sections $\theta 3$ are opposite to each other. This is because the cam ring 14 itself is advanced while rotating by the female helicoid 12 (and male helicoid 13). Namely, the displacement of the first lens group A (third lens group C) and the displacement of the second lens group B are determined as a result of the lead (inclination) of the female helicoid 12 and the inclination of the first cam grooves 14a and as a result of the lead (inclination) of the female helicoid 12 and the inclination of the second cam grooves 14b, respectively.

Between the third lens frame 30 and the first lens moving ring 23 are provided engaging portions 30a and 23a (FIGS. 5, 7, and 8), which are brought into engagement with each other as the first lens moving ring 23 moves from the accommodating position shown in FIG. 4A and then reaches the wide extremity shown in FIG. 4B in accordance with the profile of the accommodating sections $\theta 2$ of the first cam grooves 14a. On the other hand, the engaging portions 30a and 23a, engaged with each other, are disengaged as the first lens moving ring 23 moves from the wide extremity and then reaches the accommodating position. That is, the first lens moving ring 23 moves in the optical axis direction in accordance with the engagement of the first group rollers A' and the first cam grooves 14a when the cam ring 14 rotates. The engaging portions 30a and 23a are kept in engagement with each other while the first group rollers A' are located in the zooming sections $\theta 1$ and the macro transferring sections $\theta 3$ of the first cam grooves 14a. Consequently, the first lens moving ring 23 (third lens group C) and the third lens frame 30 (third lens group C) thereby move together.

Figure 5:
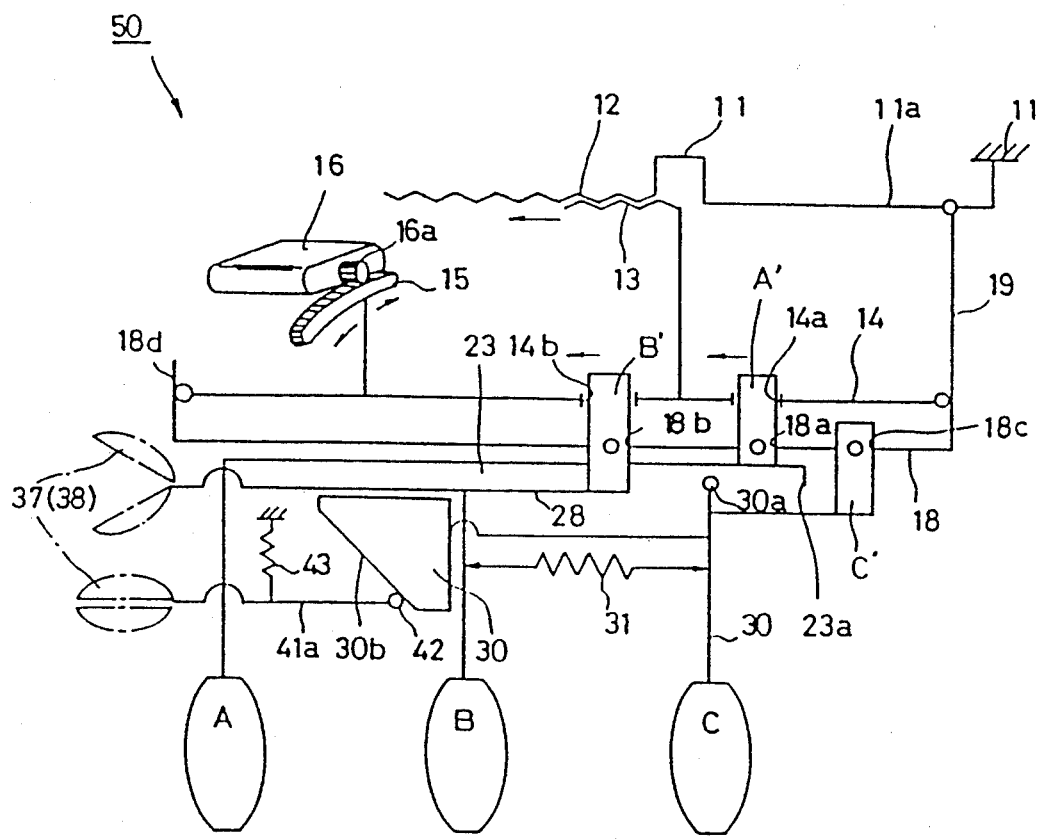
FIG. 5 is a schematic diagram of the zoom lens shown in FIGS. 4A–4C.
Figure 7:
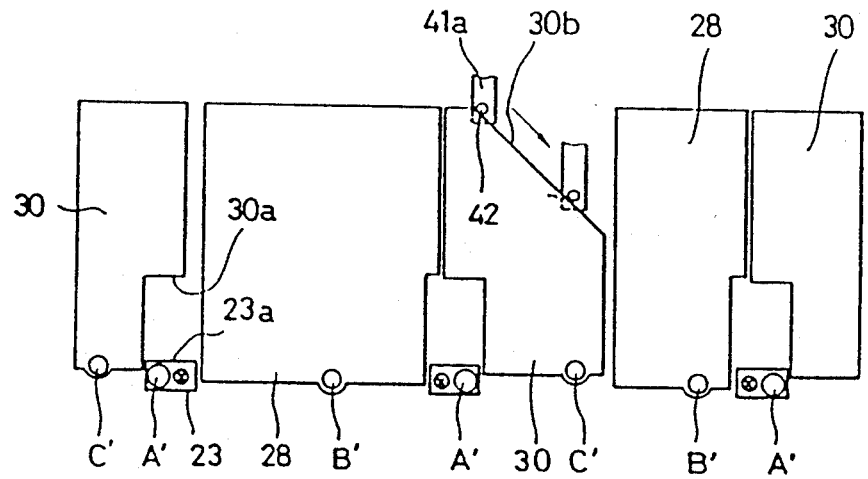
FIG. 7 is an expanded view of a third lens frame and a second lens moving ring in a zoom lens shown in FIGS. 4A–4C.
Figure 8:
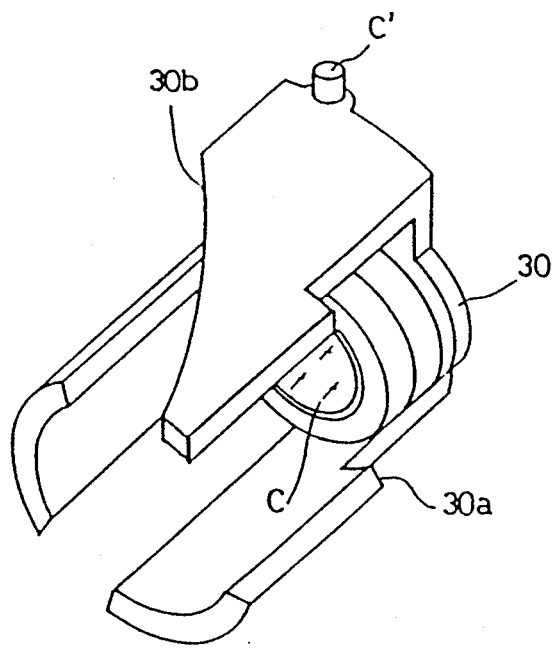
FIG. 8 is a perspective view of a third lens frame shown in FIG. 7.

On the contrary, when the first group rollers A' enter the accommodating sections $\theta 2$ of the first cam grooves 14a, the third lens frame 30 stops when it comes to the rear end of the linear movement guide grooves 18c. At this moment, the engaging portion 23a is disengaged from the engaging portion 30a, so that the engaging portion 23a moves solely backward. Thus, the second lens group B is retracted by the engagement of the second group rollers B' with the second cam grooves 14b, so that the first, second, and third lens groups A, B, and C are retracted as a whole, thus resulting in a decreased accommodation length of the zoom lens. FIGS. 5 and 7 correspond to FIG. 4A which show the accommodating position. In a photographic position shown in FIGS. 4B and 4C, the engaging portions 23a and 30a come into contact with each other.

Between the second lens moving ring 28 and the third lens frame 30 are provided compression springs 31 which are located at a plurality of circumferential positions to continuously bias the third lens frame 30 rearwardly, i.e., in a direction in which the engaging portion 30a thereof is brought into contact with the engaging portion 23a of the first lens moving ring 23.

The shutter block 26 rotates a driving pin 26a provided thereon by an angular displacement corresponding to the object distance signal detected by the object distance measuring device, as is well known. The driving pin 26a is associated with a connecting ring 33 secured to the second lens frame 25, so that when the driving pin 26a rotates, the second lens group B moves in the optical axis direction in accordance with the inner peripheral helicoid 27. The connecting ring 33 is secured to the second lens frame 25 after the adjustment (focus adjustment) of the second lens frame in the optical axis direction is completed. The AF step numbers ○ shown in FIGS. 1B-1D and FIGS. 2B-2D correspond to the stop angles (stop positions) of the driving pin 26a. The shutter block 26 opens and closes shutter blades 26b in accordance with a brightness signal of the object.

A decoration frame 35 is secured to the front portion of the first lens moving ring 23, so that a barrier mechanism 36 can be provided between the decoration frame 35 and the first lens moving ring 23 to open and close a rectangular aperture 35a of the decoration frame 35. The construction of the barrier mechanism is shown in perspective in FIG. 9, in the open position in FIG. 10A, and in the closed position in FIG. 10B.

The decoration frame 35 is provided on its rear face with a pair of sliding movement guiding grooves 35b which extend in parallel with the shorter sides of the rectangular aperture 35a. Stepped portions (projections) 35c are provided on the rear face of the decoration frame 35 to receive a pair of first barrier plates 37 and a pair of second barrier plates 38 and to guide the movement of the barrier plates 37 and 38 together with the guiding grooves 35b.

Figure 10A:
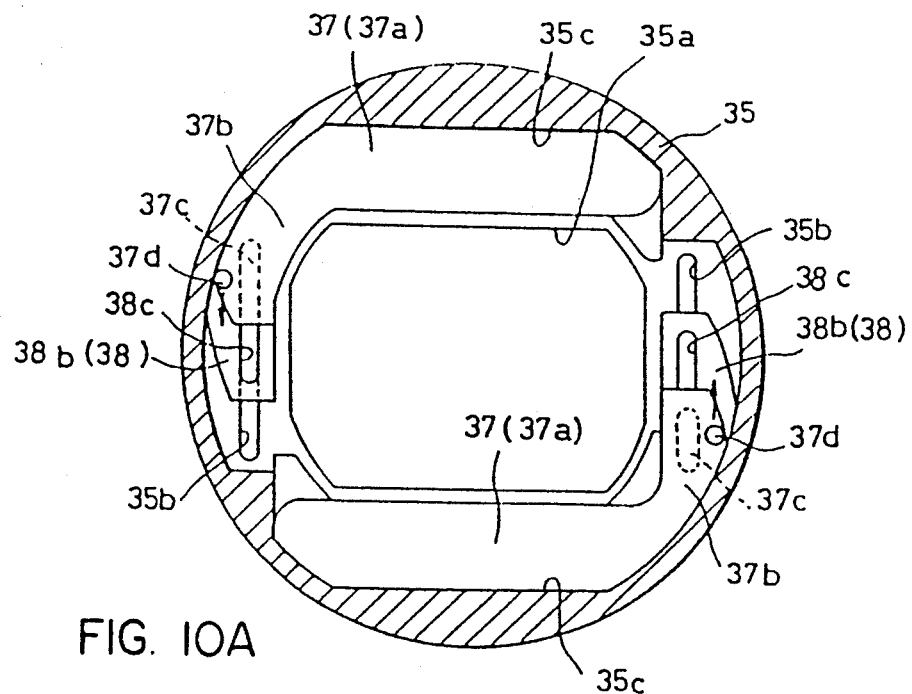
FIG. 10A and 10B are rear views of the barrier mechanism shown in FIG. 9, shown in an open position and a closed position, respectively.

The first and second barrier plates 37 and 38 have portions 37a and 38a for opening and closing the aperture 35a. The opening and closing portions extend parallel with the longer sides of the rectangular opening 35a, and the guiding portions 37b and 38b extend toward the opposite shorter sides of the rectangular opening 35a, respectively. The first barrier plates 37 and the second barrier plates 38 are superimposed one upon the other when they are in an open position in which the barrier plates 37 and 38 are located outside the opening 35a of the decoration frame 35, as shown in FIG. 10A.

Figure 10B:
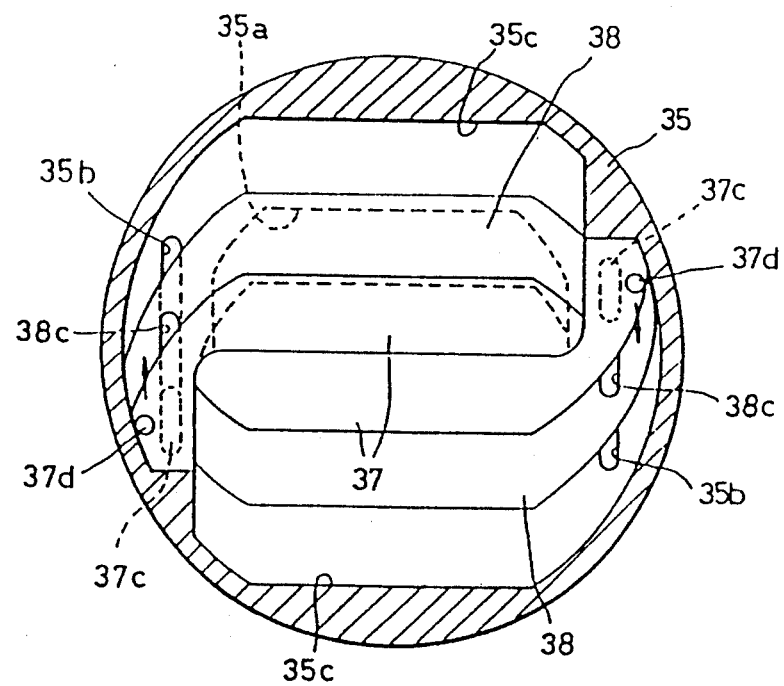

The opening and closing portions 37a of the first barrier plates 37 are provided on their front and rear side faces with key projections 37c and connecting pins 37d integral with the respective barrier plates 37. The opening and closing portions 38a of the second barrier plates 38 have elongated holes 38c in which the associated key projections 37c of the first barrier plates 37 are fitted. The elongated holes 38c are brought into contact with one end of the associated key projections 37c in the open position in which the first and second barrier plates 37 and 38 are entirely superimposed, as shown in FIG. 10A, and are brought into contact with the other ends of the associated key projections 37c in the closed position in which the opening and closing portions 37a and 38a are located side by side, i.e., partially superimposed, as shown in FIG. 10B.

The key projections 37c are fitted in both the associated elongated holes 38c and the associated sliding movement guiding grooves 35b, so that the movement of the barrier plates 37 and 38 is restricted for sliding in the direction of the length of the elongated holes 38c. The barrier plates 37 and 38 are held by and between the decoration frame 35 and a supporting plate 39 which is secured to the stepped portions 35c of the decoration frame 35 by fastening screws 39a received in threaded holes 35d.

An annular driving plate 40 and a rotational plate 41 are inserted in the decoration frame 35. The driving plate 40 is provided with two radial connector grooves 40a which are diametrically opposed to each other. The connecting pins 37d of the first barrier plates 37 are fitted in the corresponding connector grooves 40a. The rotational plate 41 has a driving arm 41a integral therewith, extending parallel with the optical axis. To the rear end (free end) of the driving arm 41a is secured a roller 42 which engages with a tapered surface 30b formed on the front end of the third lens frame 30, as shown in FIG. 5.

The driving plate 40 has a connecting projection 40b which is located in a circumferential recess 41b formed on the rotational plate 41. The rotational plate 41 also has a projection 41c, so that a tensile spring 44 is provided between, is connected to, the projection 41c and the connecting projection 40b of the driving plate 40. The rotational plate 41 is continuously biased by a tensile spring 43 which is provided between the driving arm 41a thereof and an immovable portion of the lens barrel in a direction in which the barrier plates 37 and 38 tend to close the rectangular opening 35a. The rotational plate 41 and the driving plate 40 are normally rotated together by the spring force of the tensile spring 44, but when an external force (e.g., a force against the closure of the barrier plates 37 and 38) is applied to the driving plate 40, or to a member which can be considered integral therewith, a relative rotation between the rotational plate 41 and the driving plate 40 takes place against the tensile spring 44 which is then extended.

As illustrated in FIG. 5, the tapered surface 30b is engaged by the roller 42 when the third lens frame 30 moves together with the first lens moving ring 23 in the optical axis direction in the accommodating sections θ2, so that the roller 42 is moved along the tapered surface 30b to rotate the rotational plate 41 by a predetermined angle necessary for opening and closing the barrier.

When the cam ring 14 is rotated in the forward or reverse direction by the zoom motor 16, the cam ring 14 also moves in the optical axis direction. Namely, the cam ring 14 which has the male helicoid 13, which is engaged by the stationary female helicoid 12, moves in the optical axis direction while rotating to move the linearly movable ring 18 in the same optical axis direction. Since the rotational movement of the linearly movable ring 18 is restricted by the linear movement guide plate 19 and linear movement guide groove 11a, a relative rotation occurs between the cam ring 14 and the linearly movable ring 18, so that the first lens group A and the second lens group B move in the optical axis direction in accordance with the profiles of the first cam grooves 14a and the second cam grooves 14b.

The third lens group C stops before the first cam grooves 14a of the cam ring 14 causes the first lens moving ring 23 to move in the accommodating sections θ2 to engage the engaging portion 23a of the first lens moving ring 23 with the engaging portion of the third lens frame 30, since the third group rollers C' are located at the rear ends of the associated linear movement guide grooves 18c. Further rotation of the cam ring 14 toward the zooming sections θ1 after the engagement of the engaging portions 23a and 30a is established causes the third lens group C to move together with the first lens group A. As a result, in the zooming sections θ1, the first, second, and third lens groups A, B, and C move in the optical axis direction to effect the zooming, while keeping a predetermined relationship (FIG. 1A) therebetween in accordance with the first cam grooves 14a and the second cam grooves 14b. The above discussion can be applied when the cam ring 14 moves from the zooming sections θ1 to the macro transferring sections θ3.

On the contrary, upon transferring from the zooming sections θ1 to the accommodating sections θ2, the first lens group A and the third lens group C move together, so long as the engaging portion 23a engages with the engaging portion 30a. However, the retraction of the third lens group C is restricted by the linear movement guiding grooves 18c, and only the first lens group A is retracted to come close to the third lens group C. In this moment, the second lens group B is retracted in accordance with the second cam grooves 14b to come close to the third lens group C, similarly to the first lens group A. As a result, the zoom lens can be completely accommodated in the camera body, as shown in FIG. 4A.

Figure 9:
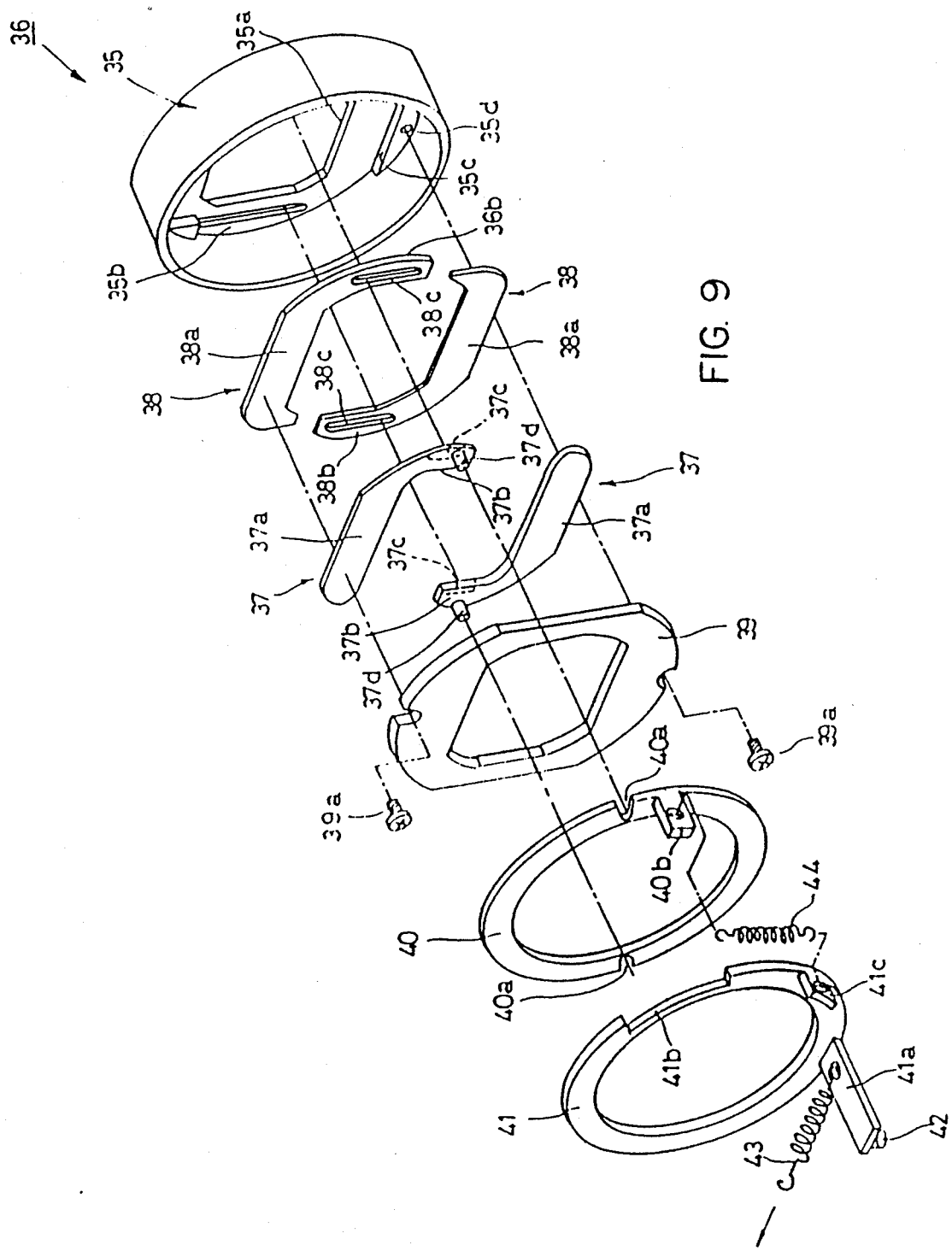
FIG. 9 is an exploded perspective view of a barrier mechanism in the zoom lens shown in FIGS. 4A–4C.

The barrier mechanism 36 operates as follows, with the help of the relative movement of the first and second lens groups A and B in the optical axis direction. When no external force is applied to the rotational plate 41, the first and second barrier plates 37 and 38 are closed, as shown in FIG. 10, by the spring force of the tensile spring 43, as shown in FIG. 9. When the first lens moving ring 23 is advanced in the accommodating sections θ2, the engaging position of the tapered surface 30b of the third lens frame 30, which is movable relative to the first lens moving ring 23 with the roller 42 of the driving arm 40, is varied, so that the rotational plate 41 is rotated against the force of the tensile spring 43. As a result, the connecting pin 37d is moved in the direction shown by an arrow through the driving plate 40, so that the pair of first barrier plates 37 move away from the center of the rectangular opening 35a. The key projections 37c of the first barrier plates 37 move in the elongated connection holes 38c of the second barrier plates 38, so that no movement of the second barrier plates 38 takes place. Here, it is supposed that the second barrier plates 38 cannot be moved by the frictional force. When the first barrier plates 37 are superimposed on the second barrier plates 38, so that the key projections 37c come to the ends of the elongated connection holes 38c, the second barrier plates 38 begin moving together with the first barrier plates 37. As a result, the first and second barrier plates 37 and 38 move together to the open position in which they are located outside the rectangular opening 35a (FIG. 10A).

When the third lens frame 30 moves relative to the first lens moving ring 23 in the accommodating sections 62 in the open position of the first and second barrier plates 37 and 38, the tapered surface 30b causes the rotational plate 41 to be rotated by the tensile spring 43, so that the connecting pin 37d is moved in the direction shown by the arrow in FIG. 10A, through the driving plate 40. As a result, the first barrier plates 37 are moved toward the center of the opening 35a. At the initial stage of the movement of the first barrier plates 37, the key projections 37c move in the elongated connection holes 38c of the second barrier plates 38, so that the latter do not move. When the key projections 37c come to the ends of the corresponding elongated connector holes 38c, the second barrier plates 38 begin moving together with the first barrier plates 37. When the opening and closing portions 37a of the first barrier plates 37 come into abutment with each other at the center of the rectangular opening 35a, the opening and closing portions 38a of the second barrier plates 38 and the opening and closing portions 37a of the first barrier plates 37 are located side by side to close the opening 35a (FIG. 10B).

Zoom Lens Control Device

The zoom lens of the present invention is controlled as follows (see particularly FIGS. 11-22).

In the embodiment to be described, the focal length range of the zoom lens is 38-105 mm (millimeters), and the number of divisions of the focal length is 12 steps of 38, 44, 50, 57, 65, 72, 80, 87, 95, 100, 105 mm and macro (105 mm). The focusing lens group B is controlled in accordance with the focal length data as mentioned above and in accordance with the object distance data.

Figure 11:
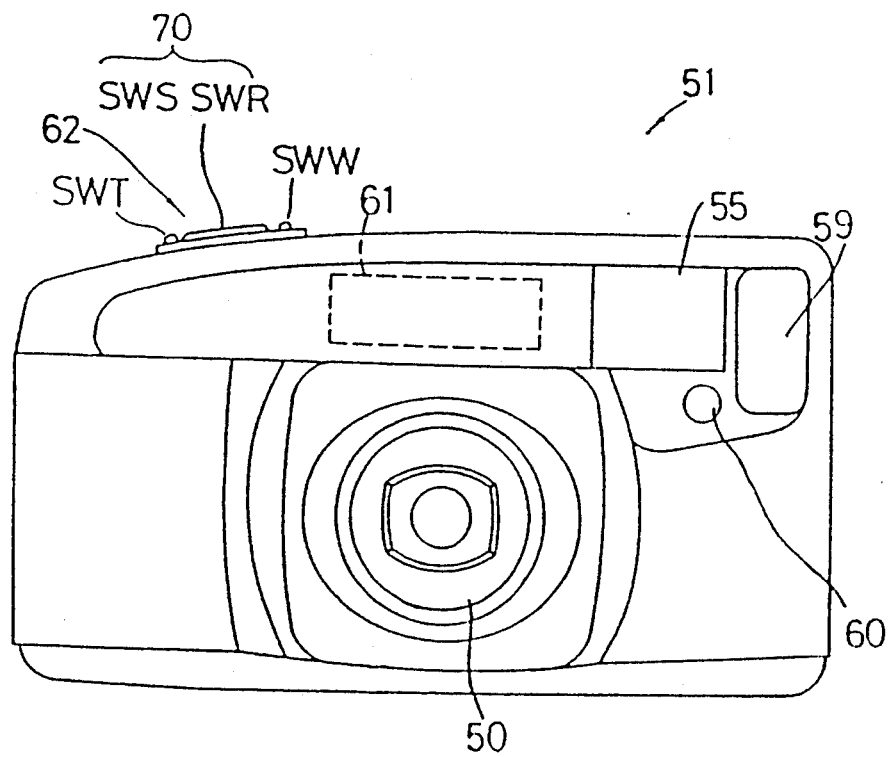
FIG. 11 is a front elevation view of an electronic control camera having a zoom lens therein according to the present invention.
Figure 12:
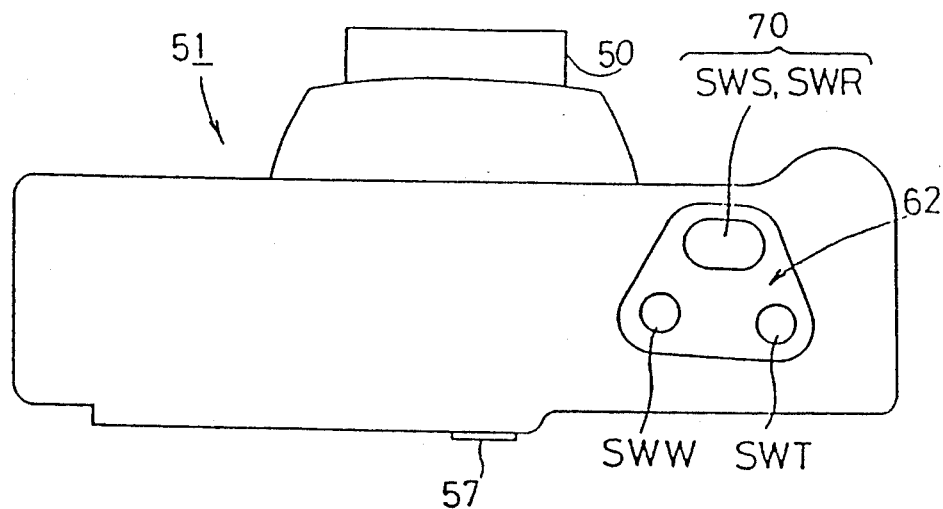
FIGS. 12 and 13 are a plan view and a rear view, respectively, of FIG. 11.
Figure 13:
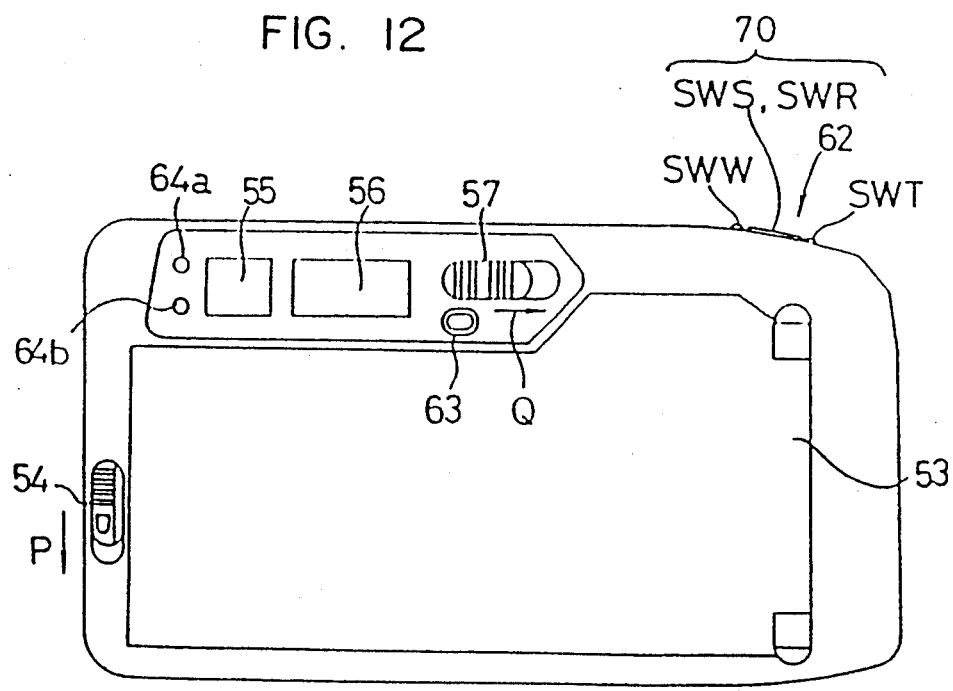

In FIGS. 11-13, a camera body 51 has a zoom lens barrel 50 having therein a zoom lens according to the present invention. The camera body 51 also has a back cover 53, a back cover opening and closing lever 54, a finder 55, a liquid crystal displaying plate 56, a main switch 57, a strobe 59, a photometering element (Cds) 60, an object distance measuring device 61, a push button switch 62 for the shutter operation and the zooming operation, a mode switching button 63, a green indicator lamp 64a, and a red indicator lamp 64b, etc. These elements are similar to those of a conventional camera, except for the arrangement or the location thereof.

Figure 14:
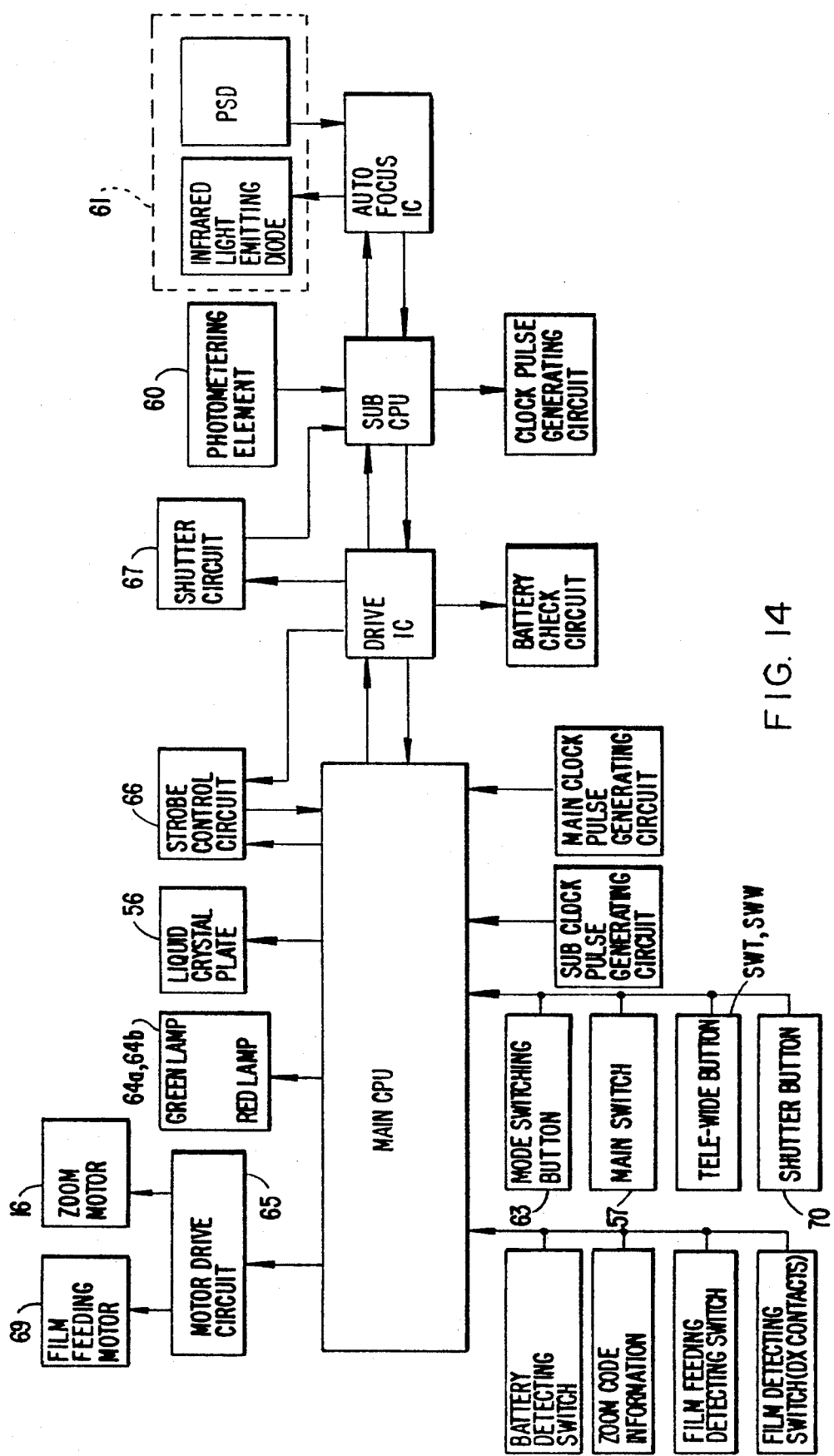
FIG. 14 is a block diagram of an electronic control circuit of an electronic control camera shown in FIG. 11.
Figure 15:
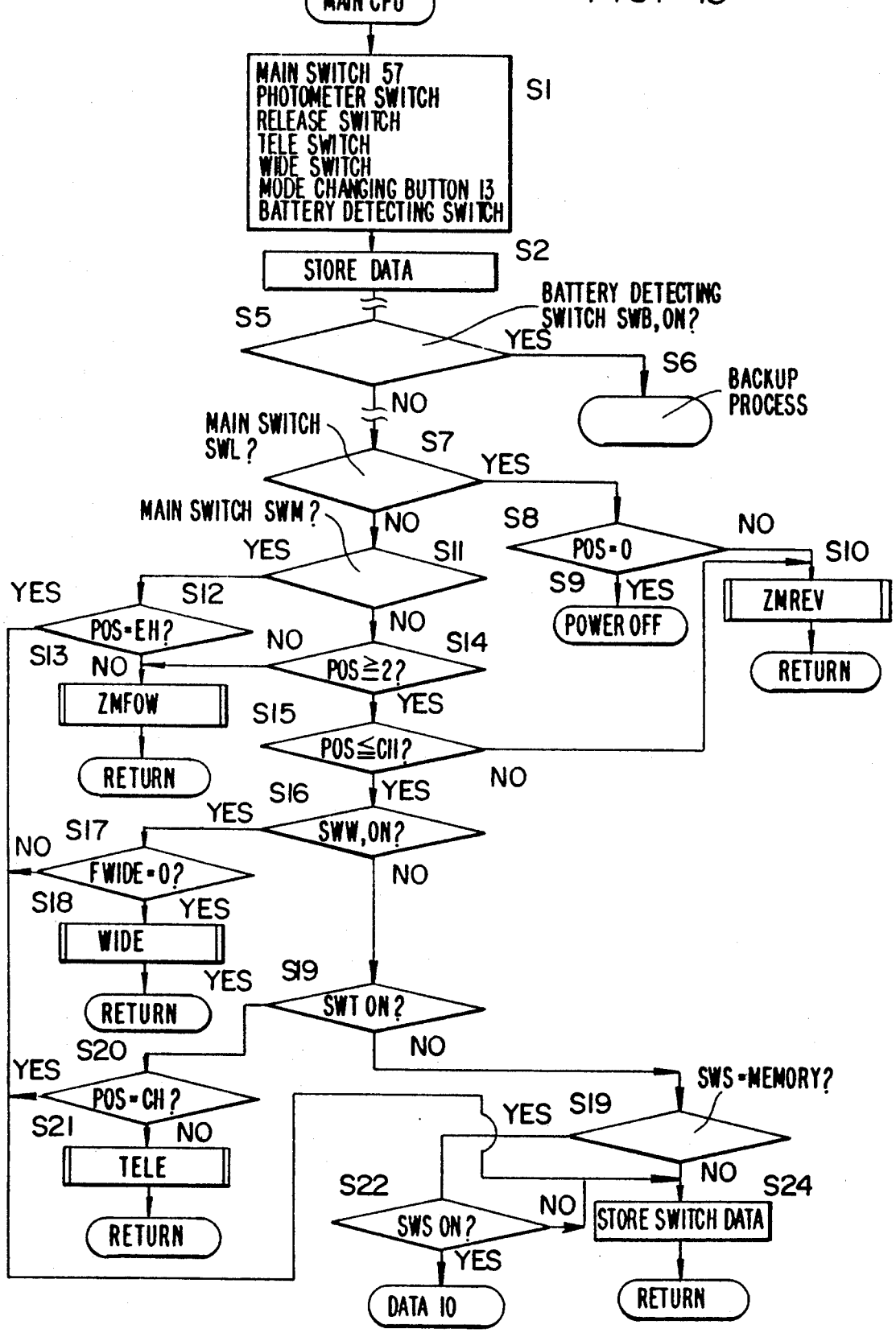
FIG. 15 is a main flowchart of an electronic control circuit shown in FIG. 14.

The back cover 53 is opened by moving the back cover opening and closing lever 54 in the direction p (FIG. 13). The main switch 57 selectively occupies a lock position SWL, a zoom position SWZ, and a macro position SWM (FIG. 15). When the main switch 57 is moved form the lock position SWL to the zoom position SWZ, or from the lock position SWL to the macro position SWM, in the direction Q (FIG. 13), the motor drive circuit 65 and the strobe control circuit 66, etc., are controlled in accordance with the control of the main CPU shown in FIG. 14.

The liquid crystal display plate 56 has various symbols for representing an idle advance of a film, a loading of film, the number of frames of a film, the position of the zoom lens (focal length), etc., in accordance with control by the main CPU. The main CPU transmits and receives data to and from a sub CPU through a drive IC, as shown in FIG. 14. The sub CPU feeds the brightness data of the photometering device 60 and the object distance data of the object distance measuring device 61, etc., to the main CPU, and transmits and receives the necessary data to and from an autofocus IC, in accordance with a predetermined sequence. The autofocus IC controls an infrared light emitting diode and supplies the object distance data which is represented by the output data of the PSD receiving light reflected from the object to the sub CPU.

The motor drive circuit 65 drives the zoom motor 16 and a film feeding motor 69. The motor drive circuit 65 is controlled by the main CPU. The mode switching button 63 is pushed to alternately change the modes between a normal photographic mode and a daylight synchronous photographic mode. The modes are indicated in the liquid crystal display plate 56.

The push button switch 62, which is provided on the top of the camera body 51, has a photometer switch SWS, a release switch SWR, a tele switch SWT, and a wide switch SWW. The photometer switch SWS and the release switch SWR constitute a shutter button 70 which is pushed by a half step to turn the photometer switch SWS ON, and is pushed by a full step to turn the release switch SWR ON.

The tele switch SWT, when actuated, drives the zoom motor 16 in the direction that the zoom lens barrel 50 projects from the camera body 51. The wide switch SWW, when actuated, drives the zoom motor 16 in the direction such that the zoom lens barrel 50 retracts into the camera body 51. The main CPU rotates the zoom motor 16 in the forward and reverse directions in accordance with the operation of the tele switch SWT and the wide switch SWW, respectively.

The main CPU performs a main flow generally shown in FIG. 15. Namely, various switch data of the main switch 57, the photometer switch SWS, the release switch SWR, the tele switch SWT, the wide switch SWW, the mode switching button 63, and a battery detecting switch SWB, which detects whether or not the battery is charged, etc., are inputted to the main CPU at step S1. These data are stored in a predetermined memory thereof at step S2. After that, at step S5, whether or not the battery is removed is checked by checking whether the battery detecting switch SWB is ON. If no battery is charged, the control proceeds to step S6 to perform a backup process. On the contrary, if the battery is loaded, the control proceeds to step S7 to determine whether the main switch 57 is in the lock position SWL.

If the main switch 57 is in the lock position SWL, the control proceeds to step S8 to check whether POS (position number) is zero (POS=0). Here, POS represents the divided step number of the focal length of the zoom lens, as shown in FIGS. 17 and 18. The position number POS represents a hexadecimal value from $O_H$ to $E_H$, although the subscript "H" is omitted in the following description.

POS=0 represents the lock position, POS=1 a stop prohibited position (i.e., a position at which the zoom lens does not stop), POS=2 through POS=C the divided step numbers of focal length of 38 mm-105 mm, POS=D a stop prohibited position, and POS=E the macro position (105 mm), respectively. Note that the numbers indicated in column "INDICATION" of FIG. 17 represent the focal lengths displayed in the liquid crystal display plate 56, corresponding to particular POS's.

Figure 16:
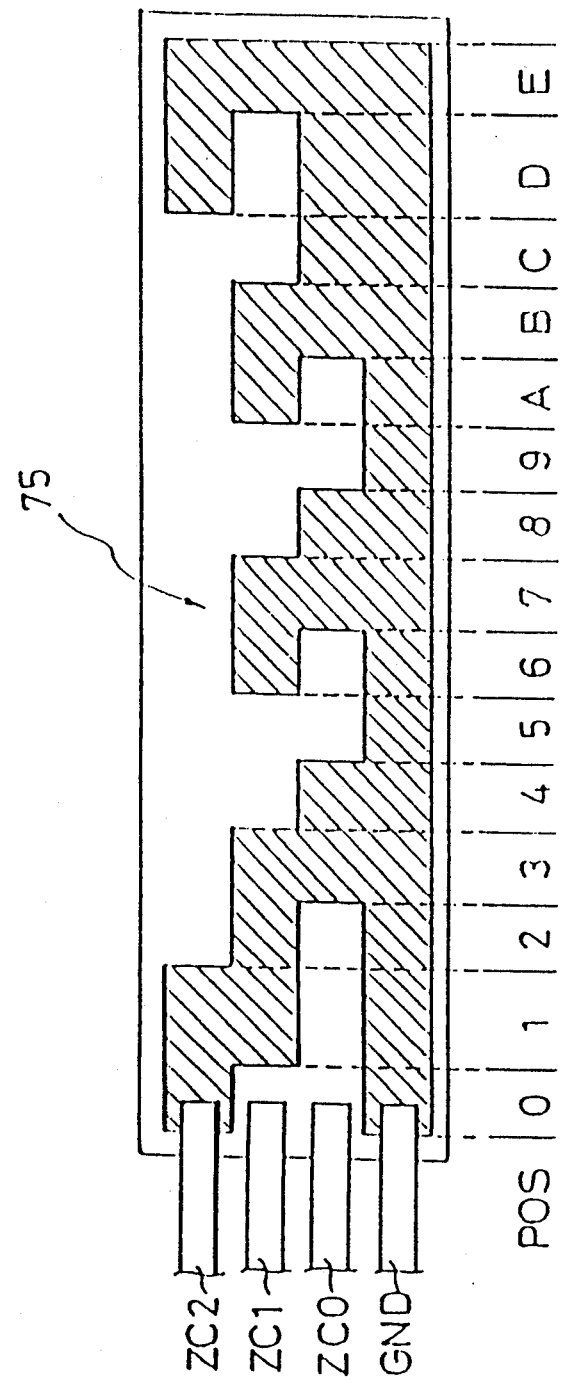
FIG. 16 is a schematic view of a zoom code plate and brushes in an electronic control camera shown in FIG. 14.

The POS's are given by the selective connection of a zoom code plate 75 to brushes ZC0, ZC1, ZC2 and GND (ground) shown in FIG. 16, which illustrates an example of a conductor pattern of the zoom code plate 75. The zoom code plate 75 is secured, for example, to the cam ring 14, and the brushes are secured to the stationary ring 11, as shown in FIG. 4A. The zoom code "ZC" shown in FIG. 17 has absolute codes 3, 1, 2, and 0, corresponding to 4 POS's of POS=0, 1, D, and E, respectively, and relative codes 4, 5, 6, and 7, corresponding to 11 POS's of POS=2 through POS=C. The relative codes appear at least twice and are necessary to detect 15 zoom lens positions with three brushes. For example, zoom code ZC=4 appears three times at POS=3, 7, and B. The POS's can be detected by counting the number of times a relative code is detected from at least one absolute code mentioned above, which corresponds to a specific lens position. Alternatively, it is also possible to use absolute codes in which each zoom code has a different POS peculiar thereto.

If POS=0 at step S8, the control proceeds to step S9 at which time the power supply is turned off. On the contrary, if POS≠0 (which means that the zoom lens is not in the retracted position), the zoom motor is reversed at step S10 and then the control is returned.

If the main switch 57 is not in the lock position SWL at step S7, whether or not the main switch 57 is in the macro position SWM is checked at step S11. If the main switch 57 is located in the macro position SWM, the control proceeds to step S12 at which time whether POS=E is determined. If POS=E, the control is jumped to step S24 at which the switch data is stored in the memory. After that, the control is returned. If POS≠E at step S12, the zoom motor 16 is rotated in the forward direction at step S13 to move the zoom lens toward the macro position. After that, the control is returned.

If the main switch 57 is not in the macro position SWM at step S11, whether POS≧2 is checked at step S14. If POS<2 (which means that the zoom lens is located at the wide extremity), the zoom motor 16 is rotated in the forward direction at step S13 to move the zoom lens toward the zoom position. If POS≧2 at step S14, the control proceeds to step S15 at which time whether POS≦C is checked. If POS>C, the control proceeds to step S10 at which the zoom motor 16 is reversed to move the zoom lens toward the zoom position. After that, the control is returned to the start of the main flow.

If POS≦C, the control proceeds to step S16 at which time whether the wide switch SWW is ON is determined. If the wide switch SWW is ON, whether the flag FWIDE is zero is determined at step S17. If FWIDE=1, which means that the zoom lens is located at the wide extremity, the control proceeds to step S24. If FWIDE=0, the zoom lens is moved toward the wide extremity to be accommodated at step S18 (wide processing). After that, the control is returned.

If the wide switch SWW is OFF at step S16, the control proceeds to step S19 to determine whether the tele switch SWT is ON. If the tele switch SWT is ON, whether POS=C is determined at step S20. If POS=C, the control jumps to step S24. If POS≠C, the zoom lens is moved toward the tele extremity at step S12 (tele processing). After that, the control is returned.

Figure 19:
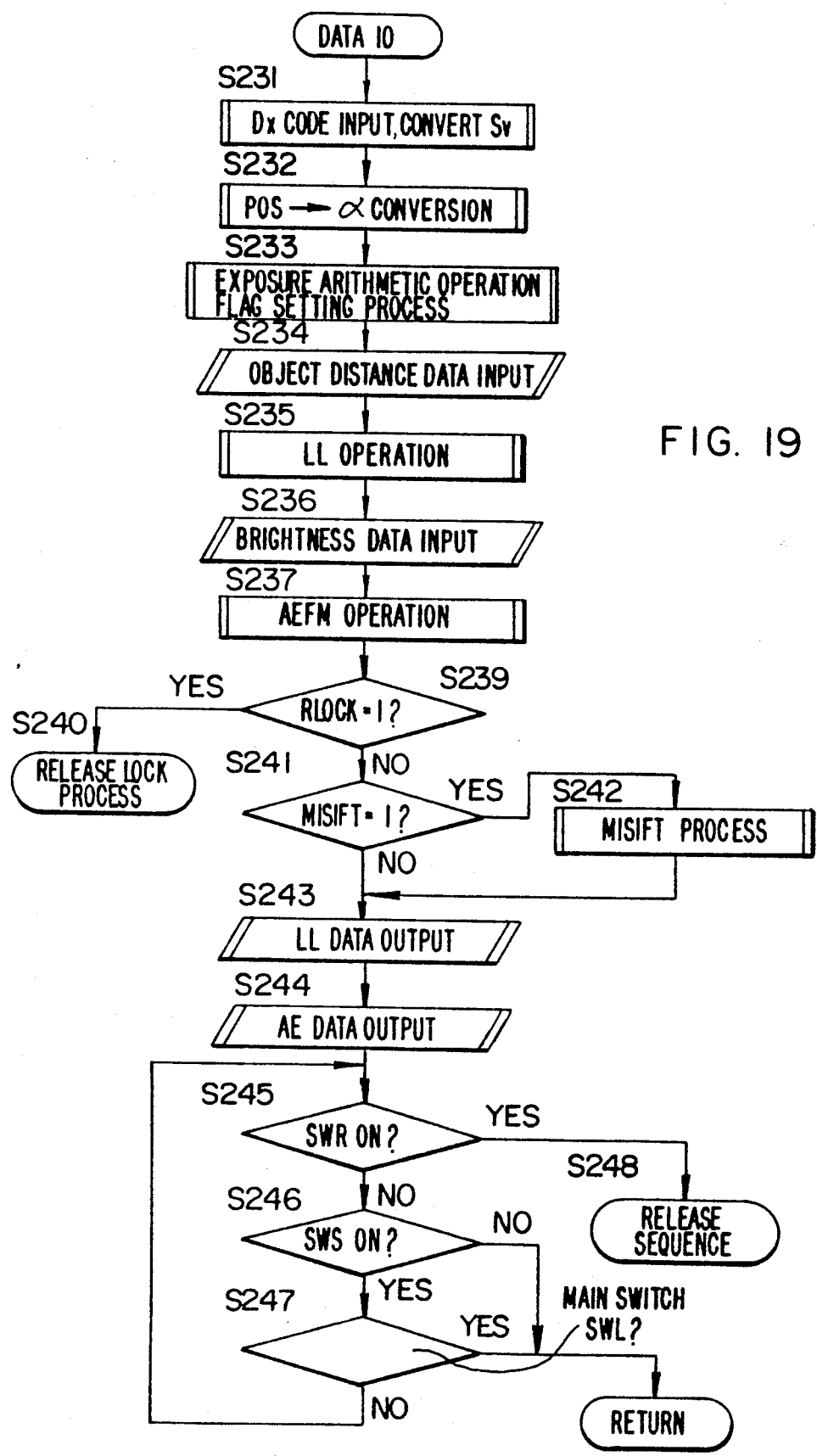
FIG. 19 is a flowchart showing processes of data input and output.

If the tele switch SWT is not ON, the control proceeds to step S19' at which time the present switch input is compared with the previously stored data to determine whether there is a change in the photometer switch SWS. If a change is detected at step S19', the control proceeds to step S24 to rewrite the switch SWS position value in memory. If no change is detected at step S19', the control proceeds to step S22 at which time it is determined whether the photometer switch time is ON. If the photometer switch SWS is not ON at step S22, the control is returned to step S24. On the contrary, if the photometer switch SWS is ON, the DATA I/O process shown in FIG. 19 is performed. Before the discussion is directed to the DATA I/O process, the following explanation will be directed to a relationship between lens latch LL, which corresponds to the focal length data, and the object distance data and focus positions.

FIG. 18 shows the focal length position (POS) and the lens latch (LL) position in connection with the detected object distance (more precisely, the separation points designated by ● mentioned above with reference to, for example, FIGS. 1B-1D). In the embodiment shown in FIG. 18, there are 24 lens latch positions (steps) LL of LL=0 through LL=25 (note: LL=0 and LL=25 are treated as LL=1 and LL=24, respectively). The lens latch positions LL correspond to the AF step numbers designated by ○ mentioned above with reference to, for example, FIGS. 1B-1D. For instance, supposing that the detected object distance is 4.50 m at POS=8 (focal length =80 mm), the lens latch position LL=6 is selected, since the separation point (m) closest to and above the detected object distance is 5.26 m. In the illustrated embodiment, the separation point to be selected is one which is closest to and above the actual detected object distance. This is the reason that the separation point 5.26 m is selected, rather than the separation point 4.46 m, in spite of the fact that the separation point 4.46 m is closer to the detected object distance 4.50 m than the selected separation point 5.26 m.

In the illustrated embodiment, the reference object distance u is selected to be 2.45 m (u =2.45 m), similar to the embodiment shown in FIGS. 1A and 1B. Accordingly, it can be easily found that when the detected object distance is equal to or near 2.45 m, the lens latch LL to be selected is 12 or 13 (LL=12 or 13), regardless of the focal length.

The following discussion will be directed to DATA I/O process, with reference to FIG. 19.

First, at step S231, the DX code inputted to the main CPU is converted to ISO sensitivity SV. After that, at step S232, an alpha (α) conversion process of the zoom code data POS of the zoom lens is performed in the form of an arithmetic operation for obtaining exposure. An exposure arithmetic operation flag setting process is performed at step S233. At step S234, the object distance data from the sub CPU is inputted. At step S235, a lens latch arithmetic operation (LL operation) is performed.

Figure 20:
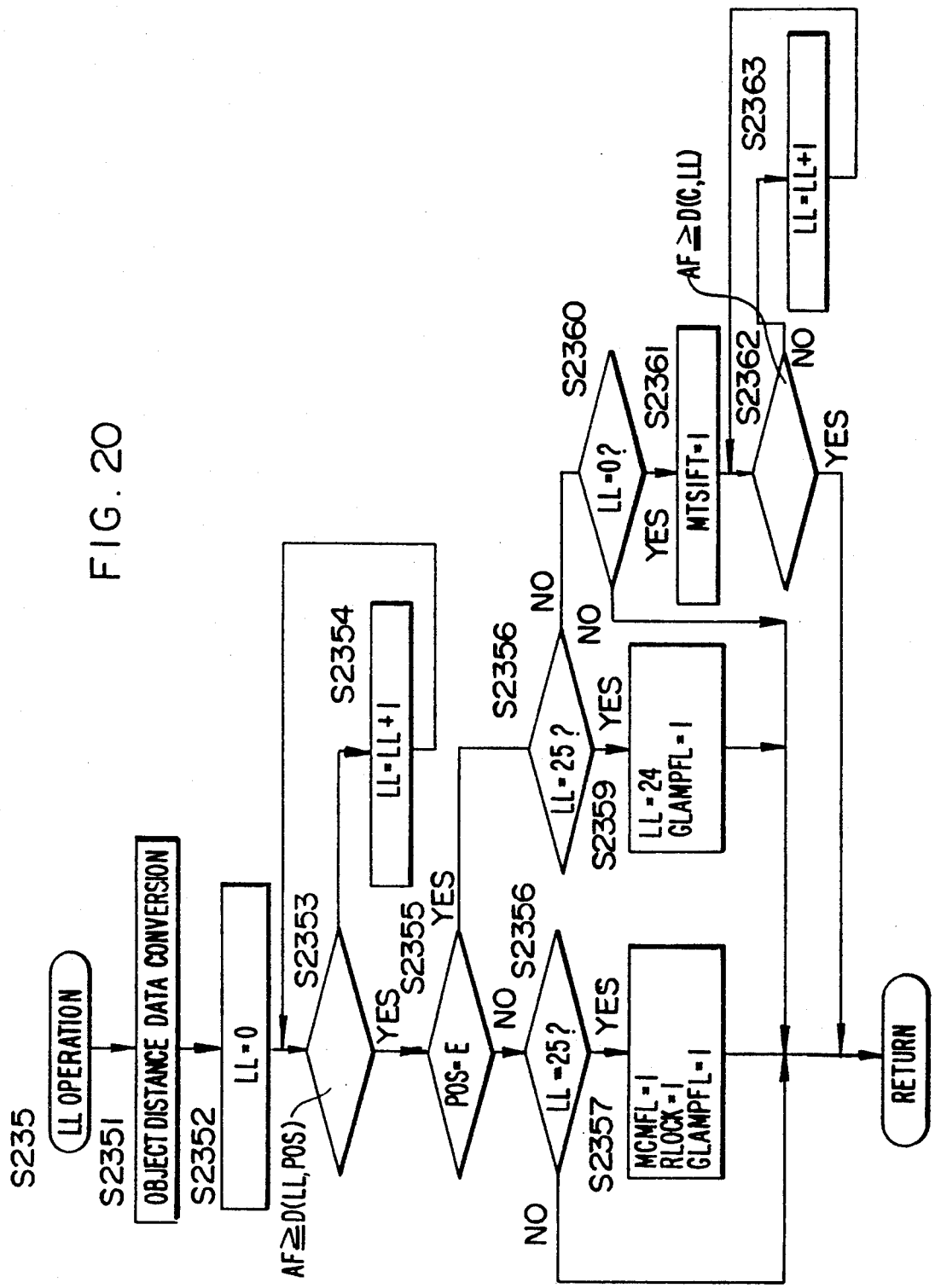
FIG. 20 is a flowchart showing a lens latch arithmetic operation.

In the LL operation shown in FIG. 20, the object distance data is limited within a range of 14 m–0.3 m, and is then compared with the values (separating points) in FIG. 18, so that a lens latch LL corresponding to the focal length data (POS) is provisionally determined (steps S2351–S2354). Upon the provisional determination, as mentioned above, a lens latch to be provisionally selected corresponds to a separation point which is closest to and more than the actual detected object distance. After that, at step S2355, whether or not POS=E (macro) is determined. If POS≠E, whether LL=25 (closer than the shortest object distance at which a picture can be taken) is checked at step S2356. If LL≠25, the provisionally selected LL mentioned above is determined to be a final lens latch LL.

If LL=25, the control proceeds to step S2357 at which time the processes of flag MCMFL=1 (for blinking the symbol representing the macro mode in the liquid crystal display plate 56), flag RLOCK=1 (for release lock operation) and flag GLAMPFL=1 (for blinking the green lamp 64a) are performed. The blinking of the green lamp 64a warns the camera user that the object is too close for a picture to be taken.

If POS=E at step S2355, whether or not LL=25 is checked at step S2358. If LL=25, the control proceeds to step S2359 to perform the operation to set the lens latch LL value as LL=24. Also at step S2359, the process of setting the flag GLAMPFL=1 is performed for warning that the object is too close for a photograph to be taken. This makes it possible to take, at LL=24, a picture of an object which is located even closer than the shortest object distance at which an "in focus" image of a picture can be taken.

If LL≠25 at step S2358, whether or not LL=0 is checked at step S2360. Namely, at step S2360, whether the object distance exceeds the maximum object distance (1.38 m) at the macro mode is checked. If LL≠0, the value of LL is determined as a final lens latch.

If LL=0, that is, if the object distance exceeds the maximum object distance in the macro mode, the process of flag MTSIFT=1 is performed for performing the macro/tele shift operation (MT shift process) at step S2361. The MT shift process is for compulsorily returning the zooming lens from the macro mode to the tele extremity. After that, the control proceeds to step S2362 at which time the object distance data is compared with the separation points at the tele extremity (POS=C) in FIG. 18, so that a value of LL which corresponds to a separation point which is closest to and above the actual detected object distance is determined to be a final lens latch.

After the completion of the arithmetic operation at step S235, as shown in FIG. 19, the brightness data (photometer data) is transferred from the sub CPU to the main CPU at step S236. After that, an automatic exposure/flashmatic arithmetic operation (AE/FM operation) is performed at step S237. After that, the control proceeds to step S239 at which time whether the flag RLOCK=1 is determined. If RLOCK=1, the control proceeds to the release lock operation.

Figure 21:
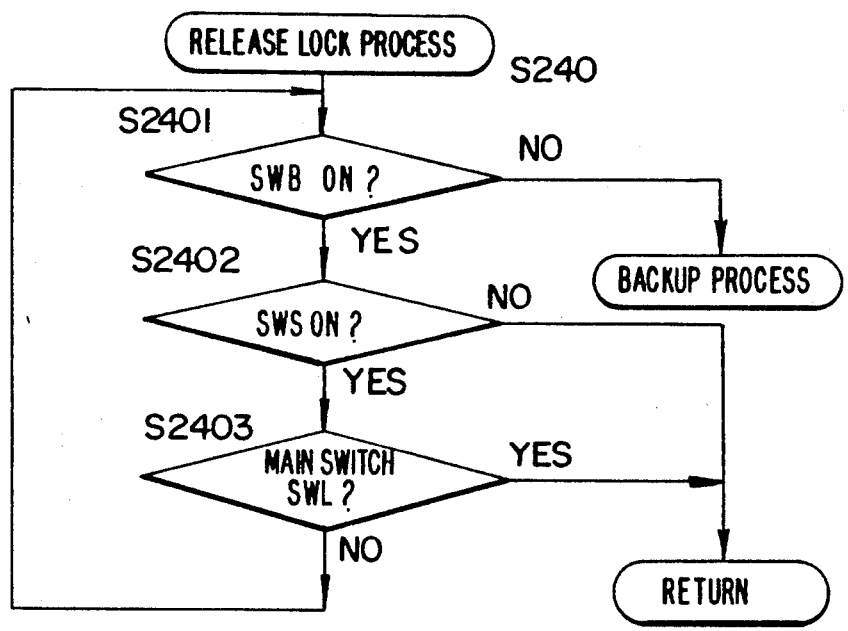
FIG. 21 is a flowchart showing release lock processes.

In the release lock process, whether the battery switch SWB is ON is determined at step S2401, as shown in FIG. 21. If the battery switch SWB is ON, whether the photometer SWS is ON is determined at step S2402. If the photometer switch SWS is ON, whether or not the main switch is located in the lock position SWL is determined at step S2403. If the photometer switch SWS is not ON, the control is returned to step S2401. Consequently, when the battery switch is ON, when the photometer switch SWS is ON, and when the main switch 57 is not in the lock position SWL, the control repeats a loop (release loop) of steps S2401-S2403. When the battery switch SWB is OFF, when the photometer switch SWS is OFF, or when the main switch 57 is moved to the lock position SWL, the control is discharged from the release loop. Note that if the battery switch SWB is OFF, the control proceeds to the backup process, and if the photometer switch SWS is OFF, or if the main switch 57 is moved to the lock position SWL, the control is returned to the main flow.

Figure 22:
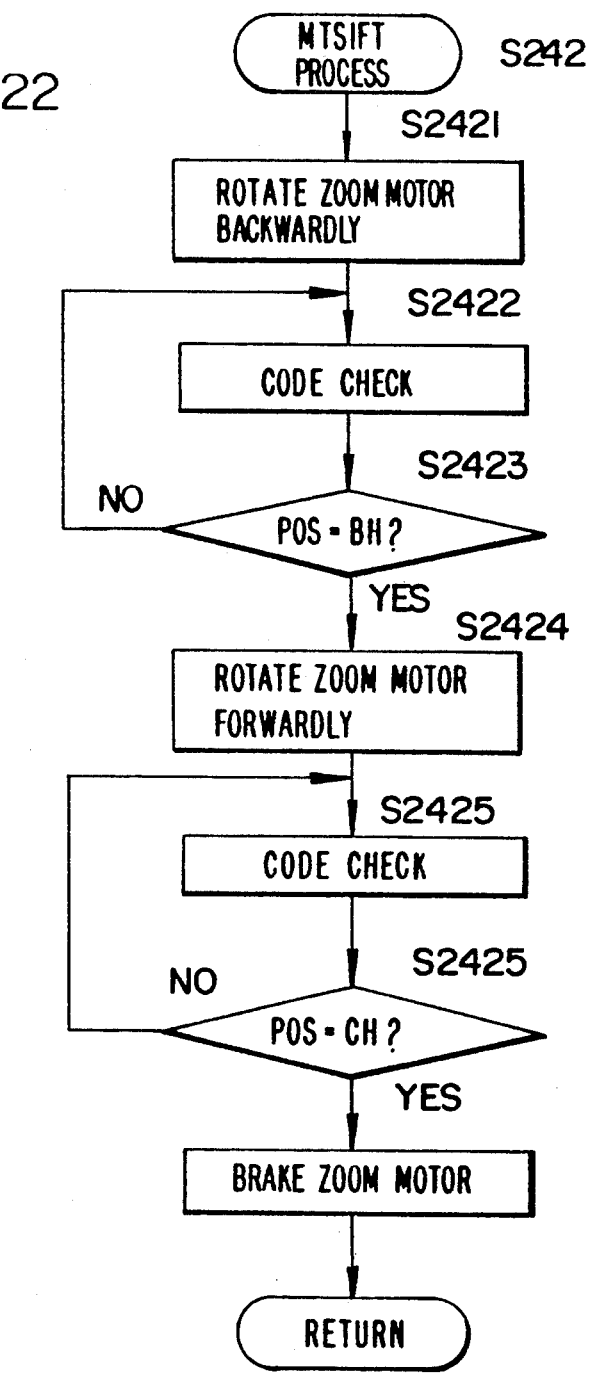
FIG. 22 is a flowchart showing macro/tele shift processes.

If the release lock flag RLOCK=0 at step S239, whether the flag MTSIFT=1 is determined at step S241. If MTSIFT=1, the control proceeds to step S242 to perform the MT shift process. In the shift process, as can be seen in FIG. 22, the zoom motor 16 is reversed at step S2421. As a result, the zoom lens barrel 50 which is located at the macro position begins moving toward the tele extremity. After that, at step S2422, the value of the zoom code is checked. Based on the results of the check, whether POS=B is determined at step S2423. The zoom code check is repeated until POS=B. When the zoom lens barrel is stopped at POS=B, the reverse rotation of the zoom motor 16 is stopped. After the elapse of a predetermined period of time, the zoom motor 16 is rotated in the forward direction again (step S2424). After the zoom motor 16 is rotated in the forward direction, the zoom code check is performed at step S2425. After that, the control proceeds to step S2426 at which time whether the zoom lens barrel 50 is moved to a position of POS=C is checked. When the zoom lens barrel comes to a predetermined position of the tele extremity side, the zoom motor is braked and stopped (step S2427).

As can be understood from the foregoing, the MT shift process functions as a switching means such that, when unexpected accidental object distance data is obtained during photographing in the macro mode, the zoom lens is moved from the macro position to the tele extremity.

The main CPU performs the process of step S243 after the MT shift process is completed. Note that if no MT shift process is performed, the control directly proceeds to step S243 to output the LL data to the sub CPU. After that, at step S244, the exposure value (AE data) is outputted to the sub CPU.

At step S245, whether the release switch SWR is ON is determined. If the release switch SWR is OFF, the control proceeds to step S246 to determine whether or not the photometer switch SWS is ON. If the photometer switch SWS is ON, whether or not the main switch 57 is located in the lock position SWL is determined at step S247. If the main switch 57 is not located in the lock position SWL, the control is returned to step S245 again. Consequently, when the release switch SWR is OFF, when the photometer switch SWS is ON, and when the main switch 57 is located in the zoom position SWZ or the macro position SWM, the control repeats a loop of steps S245 to S247. The control is returned to the main flow when photometer switch SWS is OFF, or the main switch 57 is moved toward the lock position SWL at step S247. Furthermore, when the release switch SWR is ON at a step S245, the release sequence process is performed at step S248.

Figure 23:
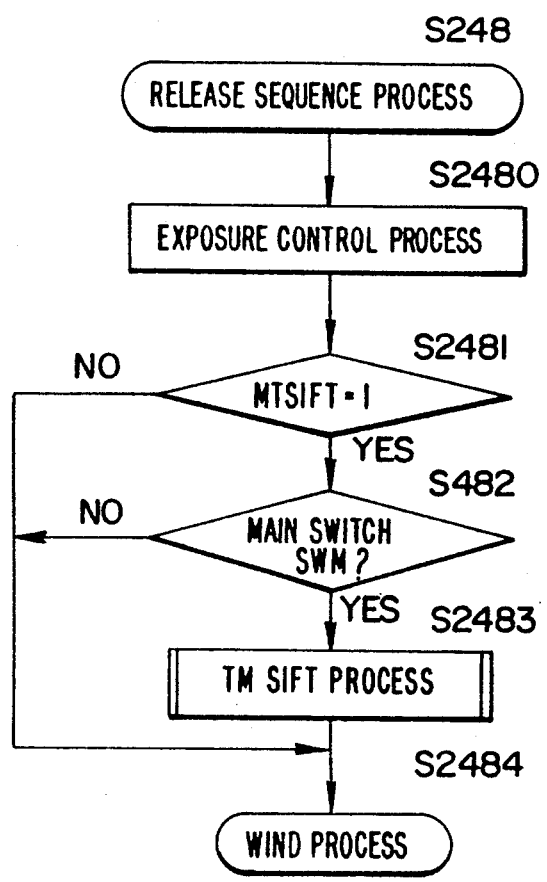
FIG. 23 is a flowchart of a release sequence.

In the release sequence process, as can be seen in FIG. 23, the control proceeds to step S2481 after the exposure control process, such as shutter driving process, is performed at step S2480. At step S2481, whether MTSIFT=1 is determined. If MTSIFT=1, the control proceeds to S2482 to determined whether the main switch 57 is in the macro position SWM. If the main switch 57 is in the macro position, the tele/macro shift process (TM shift process) is performed at step S2483.

The TM shift process functions as a returning means for returning the zoom lens from the zoom position to the macro position after the completion of photographing, when the main switch 57 is in the macro photographing mode. After the completion of the process at step S2483, the wind process is performed at step S2484. If no MT shift process is performed, the wind process is directly performed without performing the TM shift process.

Although the present invention has been described with respect to specific embodiments and examples, various modifications can be made without exceeding the scope of the present invention, which is defined by the following claims.

We claim:

1. A method for controlling the focusing of a zoom lens of a camera in which the zoom lens has a plurality of lens groups including at least one focusing lens group, wherein an amount of deviation from focus caused by a zooming operation is correctable by movement of said focusing lens group, wherein said method comprises setting a reference object distance, at which no deviation from focus occurs during zooming of said zoom lens, at a finite object distance, such that the amount of movement of said focusing lens group to effect focusing is determined based upon a reference position corresponding to a position of said focusing lens group at said reference object distance, in accordance with focal length data and object distance data.

2. The method of claim 1 further comprising setting said reference object distance to be approximately twice the closest object distance of said camera at which a picture can be taken.

3. The method of claim 1 further comprising detecting said object distance by means of an object distance measuring device which emits a measuring light toward an object to detect the object distance.

4. The method of claim 3 further comprising setting said reference object distance to be approximately twice the distance which said measuring light of said measuring device can reach.

5. The method of claim 1 further comprising providing said camera with three lens groups.

6. The method of claim 5 wherein providing said camera with three lens groups comprises providing said camera with a positive first lens group, a positive second lens group, and a negative third lens group.

7. The method of claim 5 wherein said movement of said focusing lens group is performed by said second lens group.

8. The method of claim 5 wherein said movement of said focusing lens group is performed by said third lens group.

9. The method of claim 5 wherein said movement of said focusing lens group is performed by said first and third lens groups.

10. A method of focusing a zoom lens in which said zoom lens includes a plurality of movable lens groups, including at least one focusing lens group, said method comprising positioning said focusing lens group at a reference position corresponding to a finite object distance for which no deviation from focus occurs, or substantially no deviation from focus occurs, during movement of at least one of said plurality of movable lens groups other than said focusing lens groups, and determining a direction of movement and a magnitude of movement of said focusing lens group from said reference position necessary to effect focusing of said zoom lens.

* * * * *